United States Patent
Bass et al.

(10) Patent No.: US 7,055,592 B2
(45) Date of Patent: Jun. 6, 2006

(54) TOROIDAL CHOKE INDUCTOR FOR WIRELESS COMMUNICATION AND CONTROL

(75) Inventors: Ronald Marshall Bass, Houston, TX (US); Harold J. Vinegar, Houston, TX (US); Robert Rex Burnett, Katy, TX (US); William Mountjoy Savage, Houston, TX (US); Frederick Gordon Carl, Jr., Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/689,470

(22) Filed: Oct. 20, 2003

(65) Prior Publication Data

US 2004/0079524 A1 Apr. 29, 2004

Related U.S. Application Data

(63) Continuation of application No. 09/769,047, filed on Jan. 24, 2001, now abandoned

(60) Provisional application No. 60/177,999, filed on Jan. 24, 2000, provisional application No. 60/186,376, filed on Mar. 2, 2000, provisional application No. 60/178,000, filed on Jan. 24, 2000, provisional application No. 60/186,380, filed on Mar. 2, 2000, provisional application No. 60/186,505, filed on Mar. 24, 2000, provisional application No. 60/178,001, filed on Jan. 24, 2000, provisional application No. 60/177,883, filed on Jan. 24, 2000, provisional application No. 60/177,998, filed on Jan. 24, 2000, provisional application No. 60/177,997, filed on Jan. 24, 2000, provisional application No. 60/181,322, filed on Feb. 9, 2000, provisional application No. 60/186,504, filed on Mar. 2, 2000, provisional application No. 60/186,379, filed on Mar. 2, 2000, provisional application No. 60/186,394, filed on Mar. 2, 2000, provisional application No. 60/186,382, filed on Mar. 2, 2000, provisional application No. 60/186,503, filed on Mar. 2, 2000, provisional application No. 60/186,527, filed on Mar. 2, 2000, provisional application No. 60/186,393, filed on Mar. 2, 2000, provisional application No. 60/186,531, filed on Mar. 2, 2000, provisional application No. 60/186,377, filed on Mar. 2, 2000, provisional application No. 60/186,381, filed on Mar. 2, 2000, and provisional application No. 60/186,378, filed on Mar. 2, 2000.

(51) Int. Cl.
*G01V 3/06* (2006.01)

(52) U.S. Cl. .................. 166/66.5; 166/66.1; 174/74 A; 174/105 R; 340/854.8

(58) Field of Classification Search ................ 166/65.1, 166/66.5; 174/71 C, 74 A, 105 R; 340/854.3–854.6, 340/854.8; 324/355, 368, 373, 371, 363
See application file for complete search history.

(56) References Cited

U.S. PATENT DOCUMENTS 525,663 A 9/1894 Mottinger (Continued)

FOREIGN PATENT DOCUMENTS

EP 028296 A2 5/1981

(Continued)

OTHER PUBLICATIONS

Office Action dated Apr. 6, 2005, Ser. No. 10/220,254.

(Continued)

*Primary Examiner*—David Bagnell
*Assistant Examiner*—Daniel P Stephenson
(74) *Attorney, Agent, or Firm*—Rachel Stiegel

(57) ABSTRACT

An induction choke in a petroleum well where a voltage potential is developed across the choke to power and communicate with devices and sensors in the well. Preferably, the induction choke is a ferromagnetic material and acts as an impedance to a time-varying current, e.g. AC. The petroleum well includes a cased wellbore having a tubing string positioned within and longitudinally extending within the casing. A controllable gas lift valve, sensor, or other device is coupled to the tubing. The valve sensor, or other device is powered and controlled from the surface. Communication signals and power are sent from the surface using the tubing, casing, or liner as the conductor with a casing or earth ground. For example, AC current is directed down a casing or tubing or a lateral where the current encounters a choke. The voltage potential developed across the choke is used to power electronic devices and sensors near the choke. Such induction chokes may be used in many other applications having an elongated conductor such as a pipe, where it is desirable to power or communicate with a valve, sensor, or other device without providing a dedicated power or communications cable.

11 Claims, 17 Drawing Sheets

U.S. PATENT DOCUMENTS

| | | | |
|---|---|---|---|
| 2,083,321 A | 6/1937 | Dunn et al. .................... 160/34 |
| 2,917,004 A | 12/1959 | Davis et al. |
| 3,083,771 A | 4/1963 | Chapman |
| 3,247,904 A | 4/1966 | Wakefield, Jr. |
| 3,427,989 A | 2/1969 | Bostock et al. |
| 3,465,273 A | 9/1969 | Brock ......................... 336/62 |
| 3,566,963 A | 3/1971 | Blackledge ................. 166/189 |
| 3,602,305 A | 8/1971 | Kisling, III ................. 116/134 |
| 3,732,728 A | 5/1973 | Fitzpatrick ................... 73/151 |
| 3,793,632 A | 2/1974 | Still ........................... 340/18 |
| 3,814,545 A | 6/1974 | Waters ........................ 417/90 |
| 3,837,618 A | 9/1974 | Juhel .......................... 251/129 |
| 3,980,826 A | 9/1976 | Widmer ....................... 178/68 |
| 4,068,717 A | 1/1978 | Needham .................... 166/272 |
| 4,087,781 A | 5/1978 | Grossi et al. ................. 340/18 |
| 4,295,795 A | 10/1981 | Gass et al. .................. 417/111 |
| 4,350,205 A | 9/1982 | Goldschild et al. ......... 166/375 |
| 4,393,485 A | 7/1983 | Redden ....................... 367/25 |
| 4,468,665 A | 8/1984 | Thawley et al. ......... 340/853.2 |
| 4,576,231 A | 3/1986 | Dowling et al. ............ 166/248 |
| 4,578,675 A | 3/1986 | MacLeod .................... 340/855 |
| 4,596,516 A | 6/1986 | Scott et al. .................... 417/58 |
| 4,630,243 A | 12/1986 | MacLeod ..................... 367/82 |
| 4,648,471 A | 3/1987 | Bordon ...................... 175/4.55 |
| 4,662,437 A | 5/1987 | Renfro ....................... 166/65.1 |
| 4,681,164 A | 7/1987 | Stacks ........................ 166/304 |
| 4,709,234 A | 11/1987 | Forehand et al. ........... 340/856 |
| 4,738,313 A | 4/1988 | McKee ........................ 166/372 |
| 4,739,325 A | 4/1988 | MacLeod .................... 340/854 |
| 4,771,635 A | 9/1988 | Trevillion .................... 73/155 |
| 4,793,414 A | 12/1988 | Nguyen et al. ............. 166/252 |
| 4,839,644 A | 6/1989 | Safinya et al. .............. 340/854 |
| 4,852,648 A | 8/1989 | Akkerman et al. ......... 166/66.4 |
| 4,886,114 A | 12/1989 | Perkins et al. ............. 166/65.1 |
| 4,901,069 A | 2/1990 | Veneruso .................... 340/853 |
| 4,972,704 A | 11/1990 | Wellington et al. ........... 73/155 |
| 4,981,173 A | 1/1991 | Perkins et al. .............. 166/66.4 |
| 5,001,675 A | 3/1991 | Woodward ................... 367/13 |
| 5,008,664 A | 4/1991 | More et al. ................. 340/854 |
| 5,031,697 A | 7/1991 | Wellington et al. ......... 166/250 |
| 5,130,706 A * | 7/1992 | Van Steenwyk ......... 340/854.6 |
| 5,134,285 A | 7/1992 | Perry et al. ................. 250/269 |
| 5,160,925 A | 11/1992 | Dailey et al. ............ 340/853.3 |
| 5,162,740 A | 11/1992 | Jewell ........................ 324/347 |
| 5,172,717 A | 12/1992 | Boyle et al. ................. 137/155 |
| 5,176,164 A | 1/1993 | Boyle ......................... 137/155 |
| 5,191,326 A | 3/1993 | Montgomery ............ 340/855.5 |
| 5,230,383 A | 7/1993 | Pringle et al. .............. 166/66.4 |
| 5,246,860 A | 9/1993 | Hutchins et al. .............. 436/27 |
| 5,251,328 A | 10/1993 | Shaw ........................... 455/73 |
| 5,257,663 A | 11/1993 | Pringle et al. .............. 166/66.4 |
| 5,267,469 A | 12/1993 | Espinoza ..................... 73/40.5 |
| 5,278,758 A | 1/1994 | Perry et al. ................. 364/422 |
| 5,291,947 A | 3/1994 | Stracke ........................ 166/187 |
| 5,331,318 A | 7/1994 | Montgomery ............ 340/855.4 |
| 5,353,627 A | 10/1994 | Diatschenko et al. ....... 73/19.03 |
| 5,358,035 A | 10/1994 | Grudzinski ................... 166/53 |
| 5,367,694 A | 11/1994 | Ueno .......................... 395/800 |
| 5,394,141 A | 2/1995 | Soulier .................... 340/854.4 |
| 5,396,232 A | 3/1995 | Mathieu et al. .......... 340/854.5 |
| 8,396,232 | 3/1995 | Mathieu et al. .......... 340/854.5 |
| 5,425,425 A | 6/1995 | Bankson et al. ............. 166/377 |
| 5,447,201 A | 9/1995 | Mohn ......................... 166/375 |
| 5,458,200 A | 10/1995 | Lagerlef et al. ............ 166/372 |
| 5,467,083 A | 11/1995 | McDonald et al. ....... 340/854.6 |
| 5,473,321 A | 12/1995 | Goodman et al. ........ 340/854.9 |
| 5,493,288 A | 2/1996 | Henneuse ................ 340/854.4 |
| 5,531,270 A | 7/1996 | Fletcher et al. ............... 166/53 |
| 5,561,245 A | 10/1996 | Georgi et al. ............. 73/152.02 |
| 5,574,374 A | 11/1996 | Thompson et al. ......... 324/338 |
| 5,576,703 A | 11/1996 | MacLeod, deceased et al. ........................ 340/854.4 |
| 5,587,707 A | 12/1996 | Dickie et al. .......... 340/870.09 |
| 5,592,438 A | 1/1997 | Rorden et al. ................ 367/83 |
| 5,662,165 A | 9/1997 | Tubel et al. ........... 166/250.01 |
| 5,723,781 A | 3/1998 | Pruett et al. .............. 73/152.18 |
| 5,730,219 A | 3/1998 | Tubel et al. ............. 66/250.01 |
| 5,745,047 A * | 4/1998 | Van Gisbergen et al. 340/853.1 |
| 5,782,261 A | 7/1998 | Becker et al. .............. 137/155 |
| 5,797,453 A | 8/1998 | Hisaw ...................... 166/117.5 |
| 5,881,807 A | 3/1999 | Boe et al. .................... 166/100 |
| 5,883,516 A | 3/1999 | Van Steenwyk et al. .... 324/366 |
| 5,887,657 A | 3/1999 | Bussear et al. .............. 166/336 |
| 5,896,924 A | 4/1999 | Carmody et al. .............. 166/53 |
| 5,934,371 A | 8/1999 | Bussear et al. ................ 166/53 |
| 5,937,945 A | 8/1999 | Bussear et al. ......... 166/250.15 |
| 5,941,307 A | 8/1999 | Tubel ......................... 166/313 |
| 5,942,990 A | 8/1999 | Smith et al. ............. 340/853.7 |
| 5,955,666 A | 9/1999 | Mullins .................... 73/52.18 |
| 5,959,499 A | 9/1999 | Khan et al. ................. 330/149 |
| 5,960,883 A | 10/1999 | Tubel et al. ................. 166/313 |
| 5,963,090 A | 10/1999 | Fukuchi ..................... 330/149 |
| 5,971,072 A | 10/1999 | Huber et al. ................ 166/297 |
| 5,975,204 A | 11/1999 | Tubel et al. ........... 166/250.15 |
| 5,995,020 A | 11/1999 | Owens et al. ............ 340/854.9 |
| 6,012,015 A | 1/2000 | Tubel ............................ 702/6 |
| 6,012,016 A | 1/2000 | Bilden et al. ................. 702/12 |
| 6,037,767 A * | 3/2000 | Crescenzo et al. .......... 324/220 |
| 6,070,608 A | 6/2000 | Pringle ....................... 137/155 |
| 6,089,322 A | 7/2000 | Kelley et al. ................ 166/370 |
| 6,123,148 A | 9/2000 | Oneal ......................... 166/118 |
| 6,148,915 A | 11/2000 | Mullen et al. ............... 166/278 |
| 6,192,983 B1 | 2/2001 | Neuroth et al. ......... 166/250.15 |
| 6,208,586 B1 | 3/2001 | Rorden et al. ................ 367/35 |
| 6,310,534 B1 * | 10/2001 | Brunner ...................... 336/174 |
| 6,334,486 B1 | 1/2002 | Carmody et al. .............. 166/53 |
| 6,349,766 B1 | 2/2002 | Bussear et al. .............. 166/113 |
| 6,352,109 B1 | 3/2002 | Buckman, Sr. ......... 166/250.03 |
| 6,420,976 B1 | 7/2002 | Baggs et al. ............. 340/853.3 |
| 6,429,784 B1 | 8/2002 | Beique et al. ............ 340/853.2 |
| 6,443,228 B1 | 9/2002 | Aronstam et al. ...... 166/250.11 |
| 6,445,307 B1 | 9/2002 | Rassi et al. ............... 340/854.9 |
| 6,464,004 B1 | 10/2002 | Crawford et al. ....... 166/250.01 |
| 6,484,800 B1 | 11/2002 | Carmody et al. .............. 166/53 |
| 6,515,592 B1 * | 2/2003 | Babour et al. ........... 340/854.4 |
| 6,588,505 B1 | 7/2003 | Beck et al. ............. 166/250.17 |
| 6,633,164 B1 | 10/2003 | Vinegar et al. .............. 324/355 |
| 6,633,236 B1 | 10/2003 | Vinegar et al. ........... 340/854.4 |
| 6,662,875 B1 | 12/2003 | Bass et al. .................. 166/369 |
| 6,737,951 B1 * | 5/2004 | Decristofaro et al. ....... 336/234 |
| 6,747,569 B1 | 6/2004 | Hill et al. ................ 340/855.8 |
| 2001/0002621 A1 | 6/2001 | Vaynshteyn et al. ........ 166/387 |
| 2002/0017387 A1 | 2/2002 | Ringgenberg et al. . 166/250.17 |
| 2003/0047317 A1 | 3/2003 | Powers ....................... 166/373 |
| 2003/0056952 A1 | 3/2003 | Stegemeier et al. ... 166/250.12 |
| 2003/0086652 A1 | 5/2003 | Boudreau et al. ............ 385/49 |
| 2003/0131991 A1 | 7/2003 | Hartog et al. ........... 166/250.12 |

FOREIGN PATENT DOCUMENTS

| | | |
|---|---|---|
| EP | 295178 | 12/1988 |
| EP | 339825 | 11/1989 |
| EP | 492856 A2 | 7/1992 |
| EP | 641916 A2 | 3/1995 |
| EP | 681090 A2 | 11/1995 |
| EP | 697500 A2 | 2/1996 |
| EP | 721053 A1 | 7/1996 |
| EP | 732053 | 9/1996 |
| EP | 919696 A2 | 6/1999 |
| EP | 922835 A3 | 6/1999 |
| EP | 930518 A2 | 7/1999 |
| EP | 972909 A2 | 1/2000 |

| | | |
|---|---|---|
| EP | 999341 A2 | 5/2000 |
| EP | 0 964 134 | 8/2003 |
| FR | 2677134 | 4/1992 |
| FR | 2677134 | 12/1992 |
| GB | 2325949 A | 12/1998 |
| GB | 2327695 A | 2/1999 |
| GB | 2338253 A | 12/1999 |
| WO | 80/00727 | 4/1980 |
| WO | 93/26115 | 12/1993 |
| WO | 96/00836 | 1/1996 |
| WO | 96/24747 | 8/1996 |
| WO | 97/16751 | 5/1997 |
| WO | 97/37103 | 10/1997 |
| WO | 98/20233 | 5/1998 |
| WO | 99/37044 | 7/1999 |
| WO | 99/57417 | 11/1999 |
| WO | 99/60247 | 11/1999 |
| WO | 00/04275 | 1/2000 |
| WO | 00/37770 | 6/2000 |
| WO | 01/20126 A2 | 3/2001 |
| WO | 01/55555 A1 | 8/2001 |

OTHER PUBLICATIONS

Office Action dated Sep. 19, 2005, Ser. No. 10/220,254, Hirsch.

Office Action dated Oct. 24, 2003, Ser. No. 09/768,705, Vinegar.

Office Action dated Feb. 21, 2003, Ser. No. 09/768,705, Vinegar.

Office Action dated Feb. 28, 2002, Ser. No. 09/768,705, Vinegar.

Office Action dated Jan. 13, 2005, Ser. No. 10/220,195, VInegar.

Office Action dated Sep. 13, 2004, Ser. No. 10/220,195, Vinegar.

Office Action dated Jun. 3, 2004, Ser. No. 10/220,195. Vinegar.

Office Action dated Nov. 12, 2003, Ser. No. 10/220,195, Vinegar.

Office Action dated Apr. 8, 2005, Ser. No. 10/220,253, Vinegar.

F. Sakata, et al., "Performance Analysis of Long Distance Transmitting of Magnetic Signal on Cylindrical Steel Rod", IEEE Translation Journal on Magnetics in Japan, vol. 8, No. 2, Feb. 1993. pp. 102–106.

Otis Engineering, Field Development, Now Produce Crude with Viscosity no Higher Than This Using Otis Heavy Crude Lift System.

Brown. Connolizo and Robertson, West Texas Oil Lifting Short Course and H.W. Winkler, "Misunderstood or overlooked Gas–Lift Design and Equipment Considerations," SPE, p. 351 (1994).

Der Spek, Alex, and Aliz Thomas, "Neural–Net Identification of Flow Regime with Band Spectra of Flow–Generated Sound", SPE Reservoir Eva. & Eng.2 (6) Dec. 1999, pp. 489–498.

* cited by examiner

TOROIDAL CHOKE INDUCTOR FOR WIRELESS COMMUNICATION AND CONTROL

CROSS-REFERENCES TO RELATED APPLICATIONS

This is a continuation of application Ser. No. 09/769,047 filed Jan. 24, 2001, the entire disclosure of which is hereby incorporated by reference.

This application claims the benefit of the U.S. Provisional Applications in the following table, all of which are hereby incorporated by reference:

| U.S. PROVISIONAL APPLICATIONS | | | |
|---|---|---|---|
| T&K # | Serial Number | Title | Filing Date |
| TH 1599 | 60/177,999 | Toroidal Choke Inductor for Wireless Communication and Control | Jan. 24, 2000 |
| TH 1599x | 60/186,376 | Toroidal Choke Inductor for Wireless Communication and Control | Mar. 2, 2000 |
| TH 1600 | 60/178,000 | Ferromagnetic Choke in Wellhead | Jan. 24, 2000 |
| TH 1600x | 60/186,380 | Ferromagnetic Choke in Wellhead | Mar. 2, 2000 |
| TH 1601 | 60/186,505 | Reservoir Production Control from Intelligent Well Data | Mar. 2, 2000 |
| TH 1602 | 60/178,001 | Controllable Gas-Lift Well and Valve | Jan. 24, 2000 |
| TH 1603 | 60/177,883 | Permanent, Downhole, Wireless, Two-Way Telemetry Backbone Using Redundant Repeater, Spread Spectrum Arrays | Jan. 24, 2000 |
| TH 1668 | 60/177,998 | Petroleum Well Having Downhole Sensors, Communication, and Power | Jan. 24, 2000 |
| TH 1669 | 60/177,997 | System and Method for Fluid Flow Optimization | Jan. 24, 2000 |
| TS6185 | 60/181,322 | Optimal Predistortion in Downhole Communications System | Feb. 9, 2000 |
| TH 1671 | 60/186,504 | Tracer Injection in a Production Well | Mar. 2, 2000 |
| TH 1672 | 60/186,379 | Oilwell Casing Electrical Power Pick-Off Points | Mar. 2, 2000 |
| TH 1673 | 60/186,394 | Controllable Production Well Packer | Mar. 2, 2000 |
| TH 1674 | 60/186,382 | Use of Downhole High Pressure Gas in a Gas Lift Well | Mar. 2, 2000 |
| TH 1675 | 60/186,503 | Wireless Smart Well Casing | Mar. 2, 2000 |
| TH 1677 | 60/186,527 | Method for Downhole Power Management Using Energization from Distributed Batteries or Capacitors with Reconfigurable Discharge | Mar. 2, 2000 |
| TH 1679 | 60/186,393 | Wireless Downhole Well Interval Inflow and Injection Control | Mar. 2, 2000 |
| TH 1681 | 60/186,394 | Focused Through-Casing Resistivity Measurement | Mar. 2, 2000 |
| TH 1704 | 60/186,531 | Downhole Rotary Hydraulic Pressure for Valve Actuation | Mar. 2, 2000 |
| TH 1705 | 60/186,377 | Wireless Downhole Measurement and Control For Optimizing Gas Lift Well and Field Performance | Mar. 2, 2000 |
| TH 1722 | 60/186,381 | Controlled Downhole Chemical Injection | Mar. 2, 2000 |
| TH 1723 | 60/186,378 | Wireless Power and Communications Cross-Bar Switch | Mar. 2, 2000 |

FIELD OF THE INVENTION

The present invention relates to the use of a ferromagnetic choke in a petroleum well where a voltage potential is developed across the choke to power and communicate with devices and sensors in the well.

The current application shares some specification and figures with the following commonly owned and concurrently filed applications in the following table, all of which are hereby incorporated by reference:

| COMMONLY OWNED AND CONCURRENTLY FILED U.S. PATENT APPLICATIONS | | | |
|---|---|---|---|
| T&K # | Serial Number | Title | Filing Date |
| TH 1600US | 09/769,048 | Induction Choke for Power Distribution in Piping Structure | Jan. 24, 2001 |
| TH 1602US | 09/768,705 | Controllable Gas-Lift Well and Valve | Jan. 24, 2001 |
| TH 1603US | 09/768,655 | Permanent, Downhole, Wireless, Two-Way Telemetry Backbone Using Redundant Repeaters | Jan. 24, 2001 |
| TH 1668US | 09/769,046 | Petroleum Well Having Downhole Sensors, Communication, and Power | Jan. 24, 2001 |
| TH 1669US | 09/768,656 | System and Method for Fluid Flow Optimization | Jan. 24, 2001 |

DESCRIPTION OF RELATED ART

Several methods have been devised to place controllable valves and other devices and sensors downhole on the tubing string in a well, but all such known devices typically use an electrical cable along the tubing string to power and communicate with the devices and sensors. It is undesirable and in practice difficult to use a cable along the tubing string either integral with the tubing string or spaced in the annulus between the tubing and the casing because of the number of failure mechanisms present in such a system. Other methods of communicating within a borehole are described in U.S. Pat. Nos. 5,493,288; 5,576,703; 5,574,374; 5,467,083; 5,130,706.

U.S. Pat. No. 6,070,608 describes a surface controlled gas lift valve for use in oil wells. Methods of actuating the valve include electro-hydraulic, hydraulic, and pneumo-hydraulic. Sensors relay the position of the variable orifice and critical fluid pressures to a panel on the surface. However, when describing how electricity is provided to the downhole sensors and valves, the means of getting the electric power/signal to the valves/sensors is described as an electrical conduit that connects between the valve/sensor downhole and a control panel at the surface. U.S. Pat. No. 6,070,608 does not specifically describe or show the current path from the device downhole to the surface. The electrical conduit is shown in the figures as a standard electrical conduit, i.e., an extended pipe with individual electrically insulated wires protected therein, such that the pipe provides physical protection and the wires therein provide the current path. But such standard electrical conduits can be difficult to route at great depths, around turns for deviated wells, along multiple branches for a well having multiple lateral branches, and/or in parallel with coil production tubing. Hence, there is a need for a system and method of providing power and communications signals to downhole devices without the need for a separate electrical conduit filled with wires and strung along side of production tubing.

U.S. Pat. No. 4,839,644 describes a method and system for wireless two-way communications in a cased borehole having a tubing string. However, this system describes a downhole toroid antenna for coupling electromagnetic energy in a waveguide TEM mode using the annulus between the casing and the tubing. This toroid antenna uses an electromagnetic wave coupling which requires a substantially nonconductive fluid (such as refined, heavy oil) in the annulus between the casing and the tubing and a toroidal cavity and wellhead insulators. Therefore, the method and system described in U.S. Pat. No. 4,839,644 is expensive, has problems with brine leakage into the casing, and is difficult to use as a scheme for downhole two-way communication.

Other downhole communication schemes such as mud pulse telemetry (U.S. Pat. Nos. 4,648,471; 5,887,657) have shown successful communication at low data rates but are of limited usefulness as a communication scheme where high data rates are required or it is undesirable to have complex, mud pulse telemetry equipment downhole. Still other downhole communication methods have been attempted, see U.S. Pat. Nos. 5,467,083; 4,739,325; 4,578,675; 5,883,516; and 4,468,665 as well as downhole permanent sensors and control systems: U.S. Pat. Nos. 5,730,219; 5,662,165; 4,972,704; 5,941,307; 5,934,371; 5,278,758; 5,134,285; 5,001,675; 5,730,219; 5,662,165.

It would, therefore, be a significant advance in the operation of petroleum wells if the tubing, casing, liners and other conductors installed in the well could be used for the communication and power conductors to control and operate devices and sensors downhole in a petroleum well.

Induction chokes have been used in connection with sensitive instrumentation to protect against surges and stray voltage. For example, most personal computers have some sort of choke incorporated into its AC power cord and video signal cable for such protection. Such protection chokes work well for their intended purpose, but do not operate to define a power or communication circuit.

All references cited herein are incorporated by reference to the maximum extent allowable by law. To the extent a reference may not be fully incorporated herein, it is incorporated by reference for background purposes and indicative of the knowledge of one of ordinary skill in the art.

SUMMARY OF THE INVENTION

The problems outlined above are largely solved and met by a petroleum well having one or more ferromagnetic chokes in accordance with the present invention. Broadly speaking, the petroleum well includes a cased wellbore having a tubing string positioned within and longitudinally extending within the casing. A controllable valve, sensor, or other device is coupled to the tubing. The valve sensor, or other device is powered and controlled from the surface. Communication signals and power are sent from the surface using the tubing, casing, or liner as the conductor. For example, AC current may be directed down the tubing to a point where the current encounters a choke. The voltage potential developed across the choke is used to power communication modems, valves, electronic devices and sensors near the choke.

In more detail, a surface computer includes a modem with an AC signal imparted to a conductive conduit, such as the tubing or casing. The AC signal develops a potential across a choke and a power supply creates DC voltage to power a connected controllable valve, sensor, or other device. Preferably, the casing or liner terminates at earth and is used as the ground return conductor, although an independent ground wire may be used. In a preferred embodiment, the powered device comprises a controllable valve that regulates passage of gas between the annulus and the interior of the tubing.

In enhanced forms, the petroleum well includes one or more sensors downhole which are preferably in contact with the downhole power and communications module and communicate with the surface computer. Such sensors as temperature, pressure, acoustic, valve position, flow rates, and differential pressure gauges are advantageously used in many situations. The sensors supply measurements to the modem for transmission to the surface or directly to a programmable interface controller operating a downhole device, such as controllable valve for controlling the gas flow through the valve.

Such ferromagnetic chokes are coupled to a conductor (tubing, casing, liner, etc.) to act as a series impedance to current flow. In one form, a ferromagnetic choke is placed around the tubing or casing downhole and the AC used for power and communication signal is imparted to the tubing, casing or liner near the surface. The downhole choke around the tubing, casing or liner develops a potential used to power and communicate with a controllable valve or sensor.

In another form, a surface computer is coupled via a surface master modem and the tubing or casing to a plurality of laterals, each having a downhole slave modem to operate a controllable valve in a lateral. The surface computer can receive measurements from a variety of sources, such as the downhole sensors, measurements of the oil output, and measurements of the fluid flow in each lateral. Using such measurements, the computer can compute an optimum position of each controllable valve, more particularly, the optimum amount or composition of fluid production from each lateral. Additional enhancements are possible, such as controlling the amount of compressed gas input into the well at the surface, controlling a surfactant injection system, and receiving production and operation measurements from a variety of other wells in the same field to optimize the production of the field.

Construction of such a petroleum well is designed to be as similar to conventional construction methodology as possible. That is, the well completion process comprises cementing a casing or liner within the borehole, placing production tubing within the casing or liner and generally concentric with such casing or liner, and placing a packer above the production zone to control fluid passage in the annulus between the tubing and the casing or liner. The completed well includes a choke concentric with the tubing, casing or liner. After cementing the well the casing is partially isolated from the earth. The tubing string passes through the casing and packer and communicates with the production zone. In the section of the tubing string near the choke, sensors or operating devices are coupled to the string. With such configuration a controllable gas lift valve or sensor pod may be directly permanently coupled to the tubing (i.e. "tubing conveyed"). Alternatively, a controllable gas lift valve or sensor pod may be inserted in a side pocket mandrel. A power and communications module uses the voltage potential developed across the choke to power the valve and sensors.

A sensor and communication pod can be inserted without the necessity of including a controllable gas lift valve or other control device. That is, an electronics module having pressure, temperature or acoustic sensors, power supply, and a modem is inserted into a side pocket mandrel for communication to the surface computer using the tubing and casing conductors. Alternatively, such electronics modules may be mounted directly on the tubing and not be configured to be wireline replaceable. If directly mounted to the tubing an electronic module or a device may only be replaced by pulling the entire tubing string. In another form, an insulated tubing section near the wellhead may be used to ensure electrical isolation.

In one broad aspect, the present invention relates to a current impedance device, particularly useful in petroleum wells, comprising a cylindrical choke of ferromagnetic material having an annular bore extending longitudinally therein and adapted for receiving petroleum well cylindrical conductor therein. Many modifications are, of course possible, with such ferromagnetic chokes being applicable to casing, tubing, liners, and headers and other conductors used downhole in a petroleum well.

BRIEF DESCRIPTION OF THE DRAWINGS

Other objects and advantages of the invention will become apparent upon reading the following detailed description and upon referencing the accompanying drawings, in which:

FIG. 4a is related to FIG. 2, and shows the overall assembly of one of the chokes of FIG. 1;

FIG. 4b is related to FIG. 4a, and shows in detail the components used in the construction of the choke assembly of FIG. 4a;

DESCRIPTION OF PREFERRED EMBODIMENTS

Figure 1:
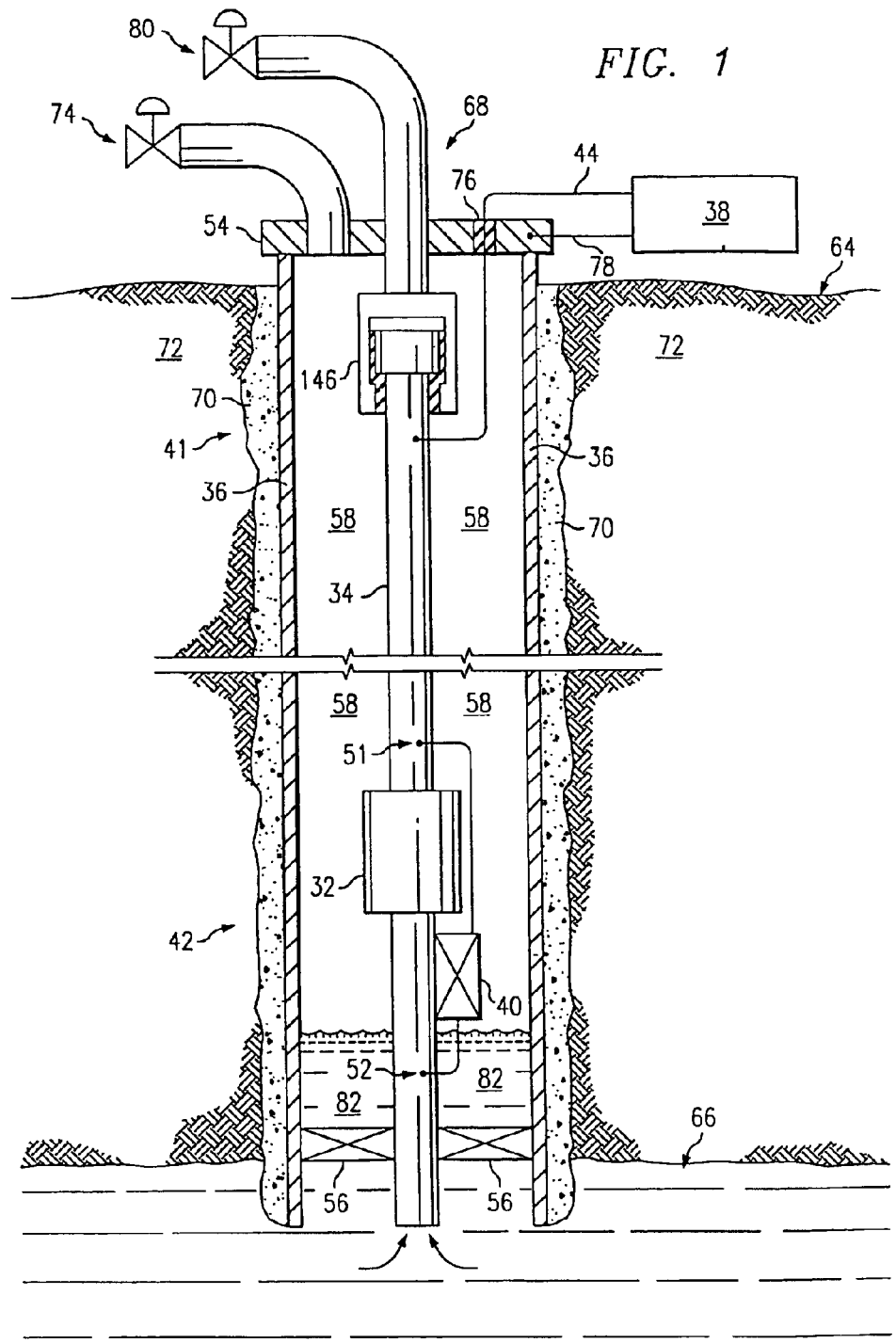
FIG. 1 is a schematic of a petroleum well illustrating the general disposition of the major elements of the present invention in relation to the major elements of a conventional well.

Referring now to the drawings, wherein like reference numbers are used to designate like elements throughout the various views, several embodiments of the present invention are further described. The figures are not necessarily drawn to scale, and in some instances the drawings have been exaggerated or simplified for illustrative purposes only. One of ordinary skill in the art will appreciate the many possible applications and variations of the present invention based on the following examples of possible embodiments of the present invention.

The terms "first end" and "second end" as used herein are defined generally to call out a side or portion of a piping structure, which may or may not encompass the most proximate locations, as well as intermediate locations along a called out side or portion of the piping structure. Similarly, in accordance with conventional terminology of oilfield practice, the descriptors "upper", "lower", "uphole" and "downhole" refer to distance along hole depth from the surface, which in deviated wells may or may not accord with absolute vertical placement measured with reference to the ground surface.

FIG. 1 shows a system defining an electrical circuit for providing power and/or communications in a well or borehole via a piping structure by using one or more unpowered induction chokes in accordance with a first embodiment of the present invention. The system of the first embodiment comprises an electrically resistive device 146, an unpowered induction choke 32, an electrically conductive piping structure 34, a well casing 36, a source of time-varying current 38, and a device pod 40.

A piping structure can be one single pipe, a tubing string, a well casing, a pumping rod, a series of interconnected pipes or rods, a branch or lateral extension of a well, or a network of interconnected pipes. For the present invention, at least a portion of the piping structure needs to be electrically conductive, such electrically conductive portion may be the entire piping structure (e.g., steel pipes, copper pipes) or a longitudinal extending electrically conductive portion combined with a longitudinally extending non-conductive or partially resistive portion. In other words, an electrically conductive piping structure is one that provides an electrical conducting path from a first end where a power source is electrically connected to a second end where a device and/or electrical return is electrically connected. The piping structure will typically be conventional round metal tubing, but the cross-section geometry of the piping structure, or any portion thereof, can vary in shape (e.g., round, rectangular, square, oval) and size (e.g., length, diameter, wall thickness) along any portion of the piping structure.

In the first embodiment shown in FIG. 1, the piping structure comprises a production tubing string 34 for a well, which is typically steel tubing. The system has an electrical impeding device 146 located about the tubing 34 along a first end 41 near the surface. Device 146 may consist of an electrically insulating joint as shown in FIG. 1, or an unpowered choke of the present invention. A lower choke 32 is located about the tubing along a second end 42 downhole within the well. The source of time-varying current 38 is electrically connected to the tubing 34 between the impeding devices 30, 32. The time-varying current can be alternating current (AC) or a varying direct current (DC), but AC is typically more practical in use. AC power and communications signals from the source 38 are connected by conductor 44 to the tubing 34 via an insulating feedthrough 76. The device 40 comprises two terminals 51, 52. A device terminal is defined generally as an electrical connection point for a device, which may include but is not limited to: a wire, a device enclosure, a prong, a pin, a contact pad, a solder point, a female receptacle, a shaft, or any combination thereof. A first device terminal 51 is electrically connected to the tubing 34 downhole between the connection location for the source of current 38 and the lower choke 32.

A second device terminal 52 is also electrically connected to the tubing 34, but at a location on the opposite side of the lower choke 32 relative to the electrical connection location for the first device terminal 51. As described further below with equations, a voltage potential exists across the choke 32 when a time-varying current flows through the tubing. Hence, the device 40 is electrically connected across the voltage potential on the tubing developed by the choke 32 when AC flows in the tubing 34, which provides current flow through the device 40.

Device 146 may consist of an electrically insulating joint hanger, or a choke in accordance with the present invention. While electrically insulating joint hangers provide true electrical isolation, they must sustain significant mechanical loads on insulating materials such as plastics or ceramics, and are therefore subject to damage from those loads. Chokes cannot provide complete isolation, but are able to sustain high mechanical loads since they are constructed such that all the load-bearing elements are composed of metal.

At least a portion of the well casing 36 is electrically conductive. The electrically conductive portion of the well casing 36 is electrically connected to the tubing 34 (e.g., via conductive fluid 82 and/or packer 56) and the source of current 38. Hence, the electrically conductive portion of the well casing 36 acts as part of an electrical return to complete the electrical circuit.

Where centralizers are used to control the position of the tubing 34 relative to the casing 36, such centralizers which are disposed between devices 30 and 32 must not be electrically conductive. Suitable centralizers are typically composed of molded or machined plastic.

Therefore, the electrical circuit is formed by the system of the first embodiment, wherein the time-varying current (e.g., AC) can flow from the power source 38 to the tubing 34, along the tubing 34 between the device 146 and the choke 32, through the device 40 to the tubing 34 below the lower choke 32, to the casing 36 via the packer 56 and/or the conductive fluid 82, and along the well casing 36 to the source 38 to complete the electrical circuit. Thus, the downhole device 40 can receive power, as well as send/receive communication signals, using the tubing 34 between the upper and lower devices 146, 32 as one of the primary conductors and as a power and/or communications path.

In the application of the first embodiment shown in FIG. 1, the gas-lift oil well extends from the surface 64 through a borehole and extends into a production zone 66 downhole. A production platform 68 is schematically illustrated above the surface 64. A hanger 54 supports the production tubing string 34 from the well casing 36. The casing 36 is conventional, i.e., it is typically metal tubing held in place by injecting cement 70 between the casing and the earth in the borehole during well completion. Similarly the tubing string 34 is generally conventional comprising a plurality of elongated tubular metal production pipe sections joined by threaded couplings (not shown) at each end of each tubing section.

A gas input throttle 74 is employed to permit the input of compressed gas into the tubing 34 via one or more valves contained within pod 40 for lifting oil during production. Schematically illustrated is a computer system and power source 38 at the surface 64 with power and communication feeds 44 passing through electrically isolating pressure seal 76 and using return connection 78, which is electrically connected to the casing 36. The degree of opening of gas lift valve may be controlled by means of setpoint commands sent by communication from the surface modem to the downhole modem and interpreted by a downhole control interface for the motor of the gas lift valve. Sensor readings from the downhole pod may either be processed locally within the pod to provide autonomous control, or the sensor readings may be conveyed to the surface by means of the communications between the downhole and surface modems, for analysis at the surface.

Figure 2:
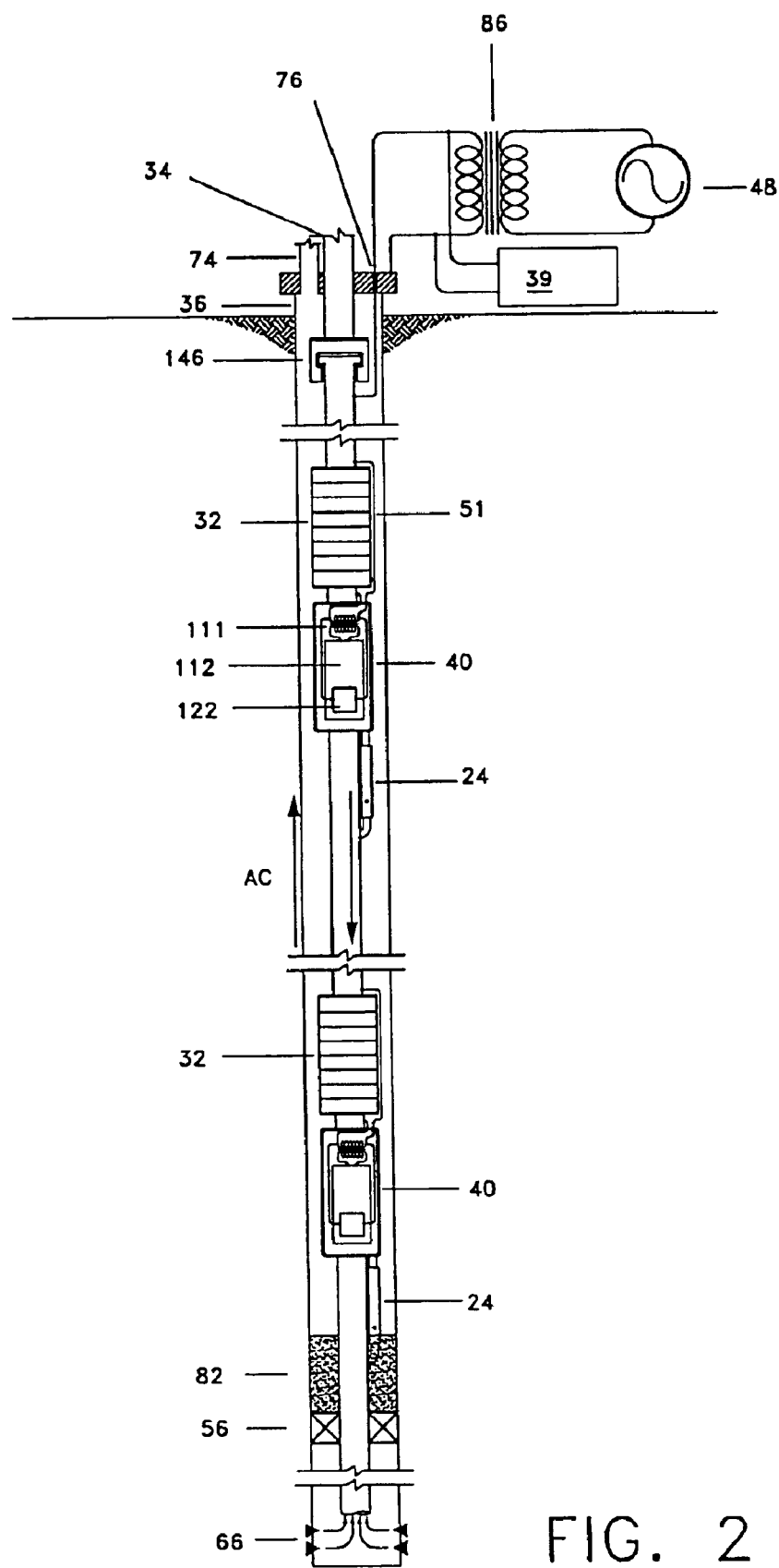
FIG. 2 is related to FIG. 1 and shows in more detail a petroleum well incorporating electrical chokes and associated communication, measurement and control equipment in accordance with the methods of the present invention.

The choke 32 is unpowered and made from a material having a high magnetic permeability (e.g., a relative permeability of 1000 to 150,000), such as a ferromagnetic metal alloy or a ferrite. The choke 32 is electrically insulated from the tubing 34 and acts to create a reactive impedance to AC flow in the tubing. In the case where the upper device 146 is a choke (rather than an electrically insulating joint), its action and construction is essentially the same as the lower choke 32. The choke 32 (and 146 in the case where it is a choke) are mounted concentric and external to the tubing 34 and are typically coated with shrink-wrap plastic to provide electrical insulation, and may additionally be enclosed within an epoxy or other structurally equivalent shell (not shown) to withstand rough handling and corrosive conditions. As described in the mathematical analysis below, the size and material of chokes can be chosen to achieve a desired series impedance value. FIG. 2 illustrates in greater detail the preferred embodiment of the invention outlined in FIG. 1 as it is applied to a gas-lift oil well. FIG. 2 illustrates such a well consisting of casing 36 extending from the surface and containing production tubing 34. At the well head the upper portion of the production tubing is electrically isolated from the lower portion by means of an electrically insulating joint hanger 146. At depth within the well the annular space between casing 36 and tubing 34 contains completion fluid 82, and an electrically conductive packer 56 which hydraulically isolates the completion fluid from the production zone 66. Fluids from the production zone 66 are conveyed to the surface by passage through the production tubing 34. In FIG. 2 the disposition of two chokes 32 are shown at depth within the well, each of which is used to power electrical pods 40. These pods implement any combination of communication, measurement and control functions to assist well production operations.

Referring still to FIG. 2, the general disposition of surface equipment is illustrated, consisting of an AC power source 48, a 1:10 power transformer 86, and a modem 39. One output side of the surface power transformer and modem circuits are connected by means of conductor 44 through a pressure sealed electrical isolation feedthrough 76 to the production tubing section below the electrically isolating hanger. The other output sides of the power transformer and the surface master modem circuits are electrically connected to the well casing.

FIG. 2 shows each pod being used to power and control a motorized gas lift valve 24. For this purpose a suitable implementation of the pod consists of a power transformer 111 with a winding ratio such that 2 Volts on the tubing side creates 15 Volts on the electronics module side (and vice versa), and a main printed circuit board (PCB) 112 having a modem 122 and other electrical components to power and control the motorized gas lift valve 24. The downhole modems within the pods communicate with the modem at the surface, and possibly with each other, allowing data to be transferred from each pod to the surface or between pods, and instructions to be passed from the surface to control each gas lift valve. Each modem is individually addressable, and each control or sensor device within each pod is individually addressable.

While FIG. 2 illustrates the case where two downhole modules are operated in the well, it will be readily apparent that the same principle may be used to provide an arbitrary number of downhole modules. This is useful in an application where a conductive completion fluid 82 is present in the annulus before unloading a gas-lift well. Each choke will not work sufficiently to develop a voltage potential at its respective device when the choke is submerged in conductive fluid, but as the conductive fluid is progressively removed during the unloading process, each device can receive power and/or communications (thus being controllable) when the respective choke is no longer submerged in conductive fluid. Hence, as the conductive fluid level drops during unloading, the devices sequentially become controllable, which aids in achieving a more controlled unloading procedure.

Figure 3:
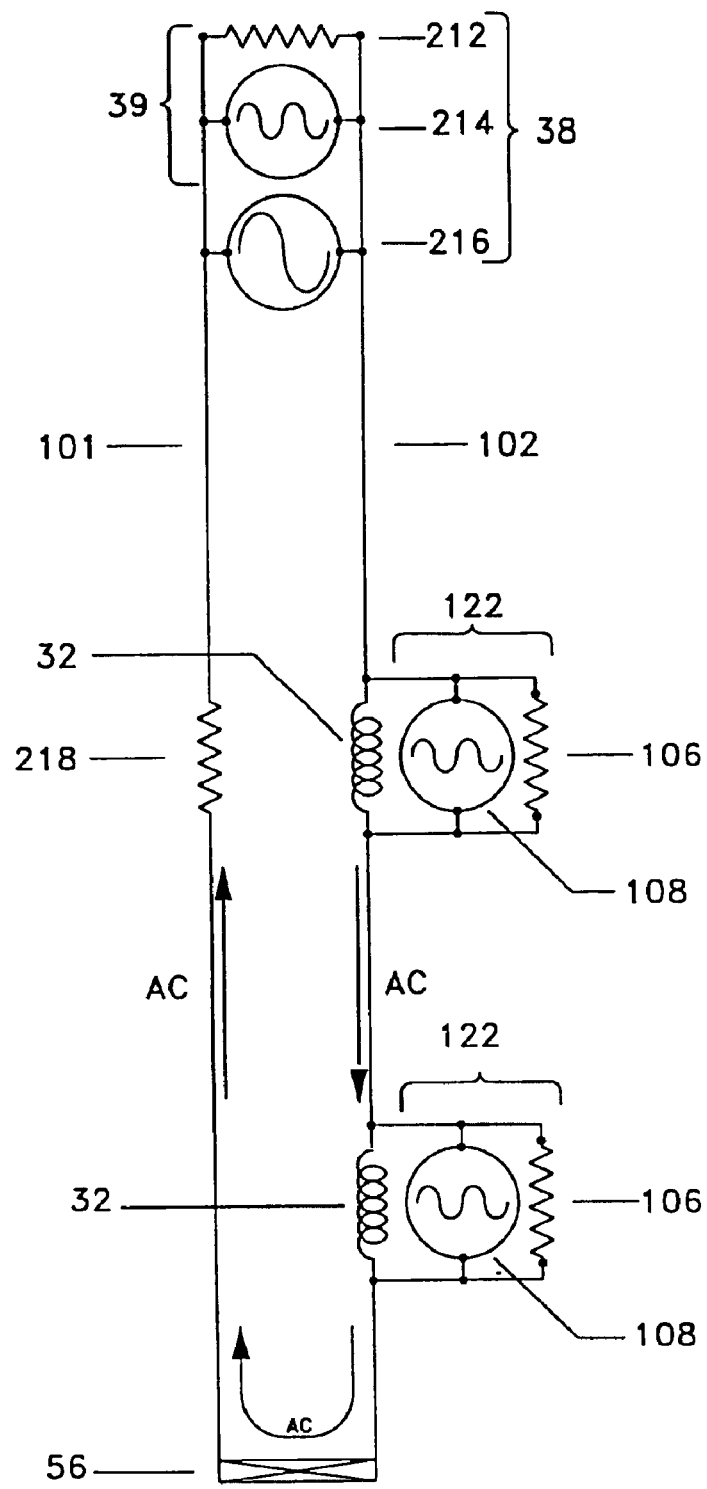
FIG. 3 is related to FIG. 2, and shows the electrical equivalent circuit of that well.

Referring to FIG. 3, the electrical equivalent circuit of the power and communications path of FIG. 2 may be analyzed. The casing and tubing form the major transmission paths for both the power and communication signals. The casing is represented by the conductor 101. The tubing is represented by conductor 102. Resistor 218 represents the combined distributed resistance offered by casing and tubing, and is typically of the order of 1 Ohm. The choke impedances are represented by inductors 32. At the frequency of the AC power the reactive impedance offered by each choke is of the order of 2 Ohms.

Referring still to FIG. 3, the surface modem ensemble 39 is represented by resistor 212 for its receiver, and an AC source 214 for its transmitter. AC power input at the surface is represented by AC source 216. The downhole electronic pods associated with each choke are represented by power converter and modem ensembles 122, composed of resistors 106 for the power converters and modem receivers, and AC sources 108 for the modem transmitters. The circuit is completed by the metal packer 56 which has a negligibly small electrical impedance.

It is seen from FIGS. 2 and 3 that the downhole pods are powered by the AC voltage developed on the tubing by each choke, caused by the back-EMF created by the passage of current along the tubing which passes through the choke. The chokes are designed to develop about 2 Volts from the AC which passes through them, and this AC is converted to DC in the power conditioning circuit which is coupled through the power supply input transformer, following standard practice for such AC-to-DC power conversion and conditioning circuits. This DC power is typically supplied to the pod sensors, modem, and control circuits at about 15 Volts, and of the order of 10 Watts is typically available to power these downhole sub-systems.

Figures 4A, 4B:
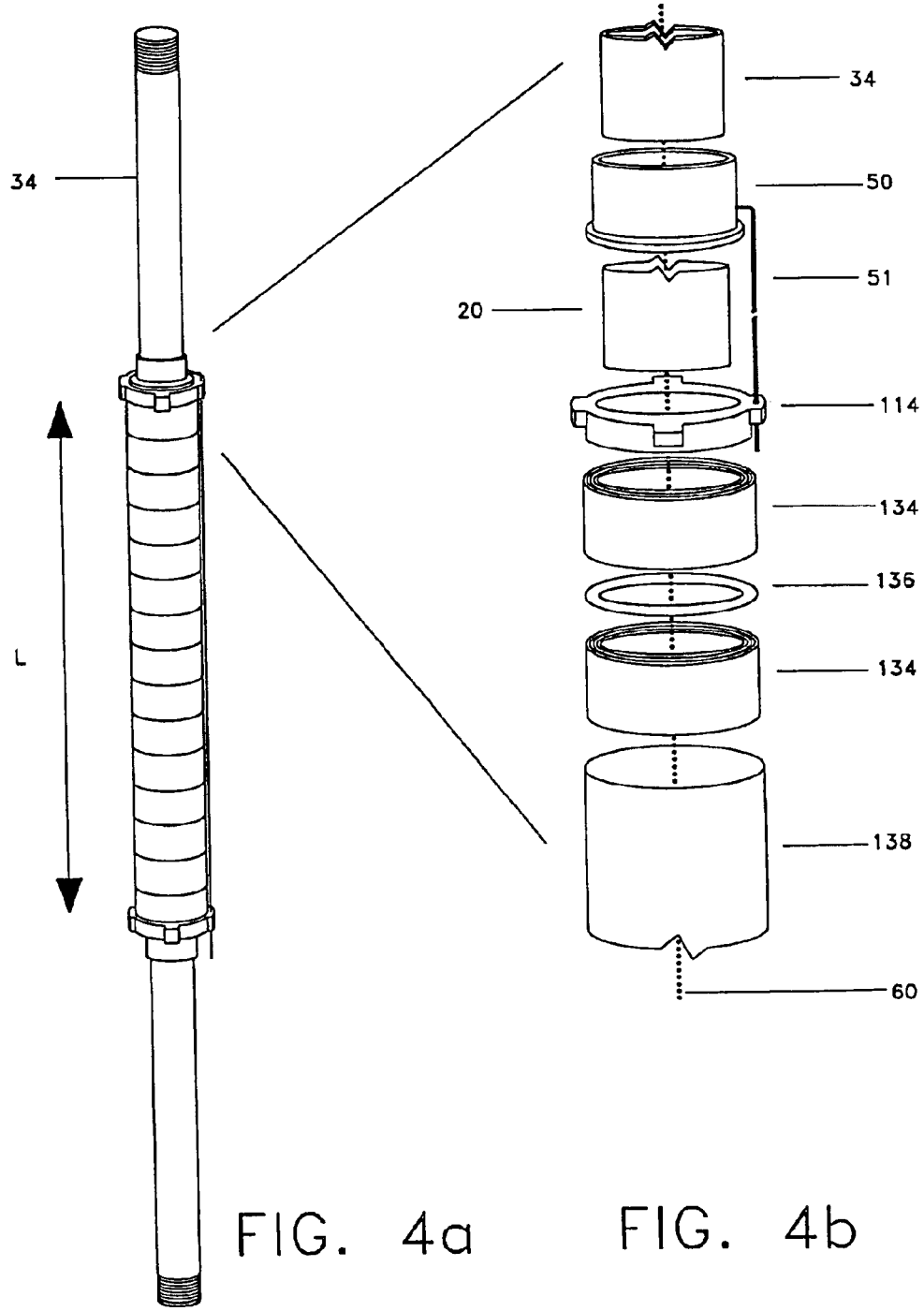

Referring to FIG. 4a, the construction of a suitable choke may be described. A choke for a given application may be divided into multiple sub-sections along its length (L). In other words, stacking multiple sub-sections of chokes 134 together along the choke axis 60, as shown in FIGS. 4a and 4b, provides the same effect as have one large choke of length (L). Multiple sub-sections 134 stacked on top of one another act as a series of impedances, which added together provide the same total impedance as a single choke having the same total length of ferromagnetic material as the aggregated sub-sections.

Referring to FIG. 4b, the details of a suitable choke assembly are illustrated, though it will be clear to one familiar with the art that alternative designs are feasible. The tubing section 34 is composed of type 316 stainless steel and typically has an outer diameter of 3.5 inches and a length of 10 feet. Each end of the production tubing section 34 is furnished with New VAM male threads by which mating sections of conventional production tubing are attached. (New VAM is a registered Trademark of Vallourec Mannesman Oil & Gas France, and defines a thread form suitable for this purpose). At the upper and lower extremities of the choke section are welding collars 50 with internal diameter 3.55 inches, length 2 inches, and wall thickness one quarter of an inch. The section of tubing 34 between the welding collars is covered with PTFE heat-shrink tubing 20 of 0.020 inches wall thickness, and thus tubing 20 lies between the production tubing section 34 and the internal walls of all the choke sub-sections 134. Each end of the choke assembly is furnished with a machined plastic centralizer 114. A suitable machinable plastic is polyetheretherketone (PEEK) which is a commodity material available from many commercial sources.

Choke sub-sections 134 are formed by winding about 60 sheet laminations of a high-permeability ferromagnetic alloy such as Permalloy (Permalloy is a registered Trademark, of Western Electric Company). Permalloy is a nickel/iron alloy with a nickel content in the range 35% to 90% and is available as a commodity material from many commercial sources. A suitable alloy is composed of 86% nickel/14% iron, and the laminations are 0.014 inches thick and 2.35 inches wide such that the final dimensions of each choke section are 3.6 inches internal diameter, 5.45 inches external diameter, and 2.35 inches in the direction of the choke axis 60. The laminating material is coated with a non-conductive material such that adjacent laminations are electrically isolated from each other, as in standard transformer construction practice. Fifteen such choke sections are stacked to form a total choke assembly suitable for usual power frequencies, 50 or 60 Hertz. At power frequencies up to a few hundred Hertz, the laminated ferromagnetic alloy construction can be used for the choke sections, as in standard transformer design practice, and as described above. Lamination is required to reduce eddy current losses which would otherwise degrade the effectiveness of the choke. For material with absolute magnetic permeability of 50,000 operating at 60 Hertz the required lamination thickness for 2 skin depths is 0.8-millimeters (0.031 inches), which is realistic and practical.

Between each choke section is a polytetrafluoroethylene (PTFE) washer 136 with internal diameter 3.6 inches, external diameter 5.45 inches, and thickness 0.030 inches. After all the chokes are threaded onto the tubing, the entire section of chokes is covered with PTFE heatshrink tubing 138 having 0.020 inches wall thickness. The stainless steel rod 51 is 0.125 inches diameter covered with polyethylene (PE) heat-shrink tubing and extends along the length of the completed choke assembly. It is attached to the upper welding collar 50 and passes through holes in the centralizers 114. Its lower end is electrically connected to the input of the electrical pod which is below the choke assembly.

The impedance offered by the choke is a critical implementation issue, since this determines what proportion of total power supplied to the pipe will be lost to leakage through the choke, and what proportion will be available to power and communicate with the devices installed in the isolated section of the pipe. Since the impedance presented by an inductor increases with frequency, the AC power frequency is used in both the theoretical analysis and the testing of alternative choke configurations, as this is normally equal to or lower than the communication frequencies.

FIGS. 5$a$–$d$ indicate the parameters used in the choke design analysis. FIGS. 5$a$ and 5$b$ illustrate the case where the choke is placed within the annulus 58 between the tubing 34 and the casing 36. FIGS. 5$c$ and 5$d$ illustrate an alternative case where the choke is placed outside the casing 36. The basis for the analysis is the same in both cases, but it is important to realize that the electrical current value (I) used in the design analysis is the net current linked by the choke. In the case where the choke is disposed in the annulus 58 (FIGS. 5$a$ and $b$), the current is that on the tubing alone. When the choke is disposed external to the casing (FIGS. 5$c$ and 5$d$), the current is the vector sum of the separate currents on the casing and tubing. Thus if these currents were to be equal but opposite in phase there would be no net choking effect with the configuration shown in FIGS. 5$c$ and 5$d$.

The defining variables and a self-consistent set of physical units are:

L=length of choke, meters;

a=choke inner radius, meters;

b=choke outer radius, meters;

r=distance from choke axis, meters;

I=r.m.s. net current through choked section, Amperes;

ω angular frequency of leakage current, radians per second;

absolute magnetic permeability of choke material at radius r, equal to the absolute permeability of free space ($4\pi \times 10^{-7}$ Henrys per meter) multiplied by the relative permeability of the magnetic material of the choke.

By definition, ($\omega = 2\pi f$ where f=frequency in Hertz.

At a distance r from the current I, the r.m.s. free space magnetic field H, in Henries per meter, is given by:

$$H = I/r$$

The field H is circularly symmetric about the choke axis, and can be visualized as magnetic lines of force forming circles around that axis.

For a point within the choke material, the r.m.s. magnetic field B, in Teslas, is given by:

$$B = H = \mu I/2\pi r$$

The r.m.s. magnetic flux F contained within the choke body, in Webers, is given by:

$$F = \int B \, dS$$

where S is the cross-sectional area of the choke in square meters as shown in FIGS. 5$a$ and 5$c$ and the integration is over the area S. Performing the integration from the inner radius of the choke (a), to the outer radius of the choke (b), over the length of the choke (L), we obtain:

$$F = \mu L I \ln(b/a)/2\pi$$

where ln is the natural logarithm function.

The voltage generated by the flux F, in Volts, is given by:

$$V = \omega F = 2\pi f F = \mu L I f \ln(b/a)$$

Note that the back-e.m.f. (V) is directly proportional to the length (L) of the choke for constant values of (a) and (b), the choke element internal and external radii. Thus by altering the length of the choke, any desired back-e.m.f. can be generated for a given current.

Inserting representative values:

μ=50,000×($4\pi \times 10^{-7}$), L=1 meter, I=10 Amperes, f=60 Hertz, a=0.045 meters (3.6 inch inner diameter), b=0.068 meters (5.45 inch external diameter):

then the back-e.m.f. developed V=2.6 Volts showing that such a choke is effective in developing the required downhole voltage, and does so when realistic and safe currents and voltages are impressed upon the tubing and transmitted from the well head to downhole equipment.

Figure 6:
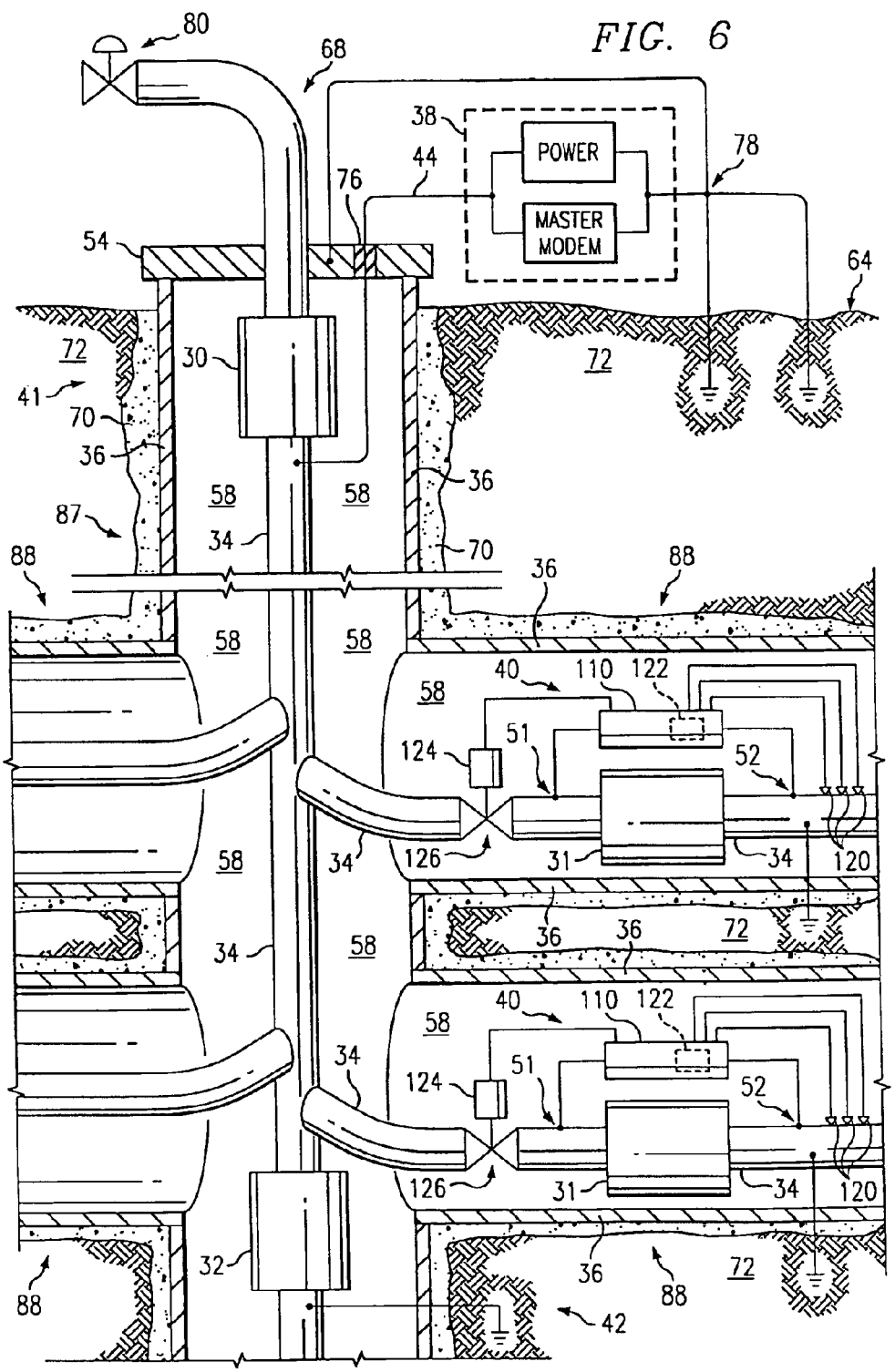
FIG. 6 is a schematic of a multilateral petroleum well incorporating electrical chokes of the present invention.

FIG. 6 shows a petroleum well application of a second embodiment in accordance with the present invention for a multilateral completion. The second embodiment is similar to the first embodiment in that the piping structure comprises the production tubing 34 but the electrical return comprises the earth 72 and the casing 36. The main borehole 87 branches into four laterals 88. The source 38 comprises a computer system having an AC power source and a modem. As long as a time-varying current is output to the electrical circuit, the source 38 may comprise any variety of electronic components, including but not limited to: a computer system, a modem, a power supply, a software program for analyzing data, a software program for controlling downhole devices, or any combination thereof. The source 38 is electrically connected at a first end 41 of the main borehole 87 between an upper choke or insulating tubing joint 30 and a lower choke 32. The lower choke 32 is located at the downhole end of the main borehole 87, below the branch points of the laterals. The lower choke 32 routes the current flowing in the tubing 34 of the main borehole 87 into the tubing 34 in the branches 88. An additional choke 31 is located within each lateral branch 88 (details of only two branches shown). Current is directed through a device 40 and across the voltage potential formed at each choke 31 within each lateral branch 88. As shown in FIG. 6, the tubing 34 is electrically connected to the earthen ground 72 at various places to complete the circuit stemming from each choke (30, 31, 32).

Each device 40 comprises a control module 110, sensors 120, a modem 122, an electric motor 124, and an electrically controllable valve 126. The control module 110 receives power and/or communications from the tubing 34, which it uses to provide power, control, and communications for the sensors 120, modem 122, and electric motor 124. The control module 110 can contain various logic structures for closed loop control of the valve 126 based on measurements taken by the sensors 120. In this example, there is a pressure sensor, a temperature sensor, and a flow sensor. However, other types of sensors 120 can also be used or substituted (e.g., acoustic sensor, chemical composition sensor). The modem 122 in the device 40 can send data from the sensors 120 to the computer system at the surface 64. Also, the modem 122 can receive control signals from the computer system via the modem in the source 38. The control module 110 provides power and control for the electric motor 124, which is capable of operating with low current. The electric motor 124 is used to open, close, or adjust the valve 126. Each control module 110 for each lateral branch 88 can be separately addressable, each sensor 120 can be separately monitored, and each valve 126 can be independently operated. Hence, using a system incorporating the third embodiment, each valve 126 in each lateral branch 88 can be electrically controlled to manage the fluid flow from each lateral.

Alternative Embodiments

It will be clear to those skilled in the art that the effect of the chokes in offering an impedance to AC current flow can be exploited in a variety of ways as alternative embodiments for the provision and distribution of power along the metal structures of wells.

Figure 7A:
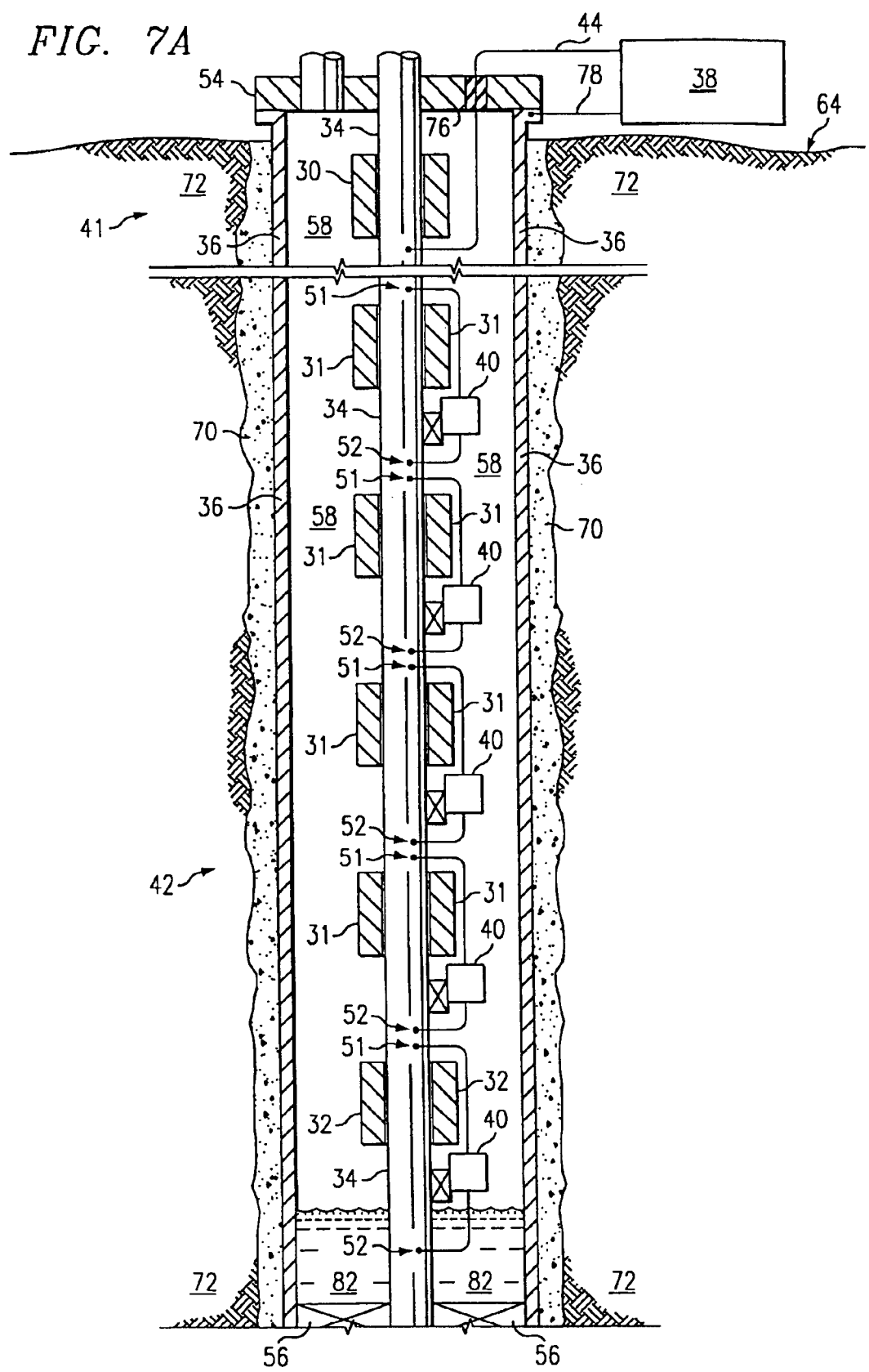
FIG. 7a is a schematic of a petroleum well illustrating downhole equipment power and communications connections in electrical series.
Figure 7B:
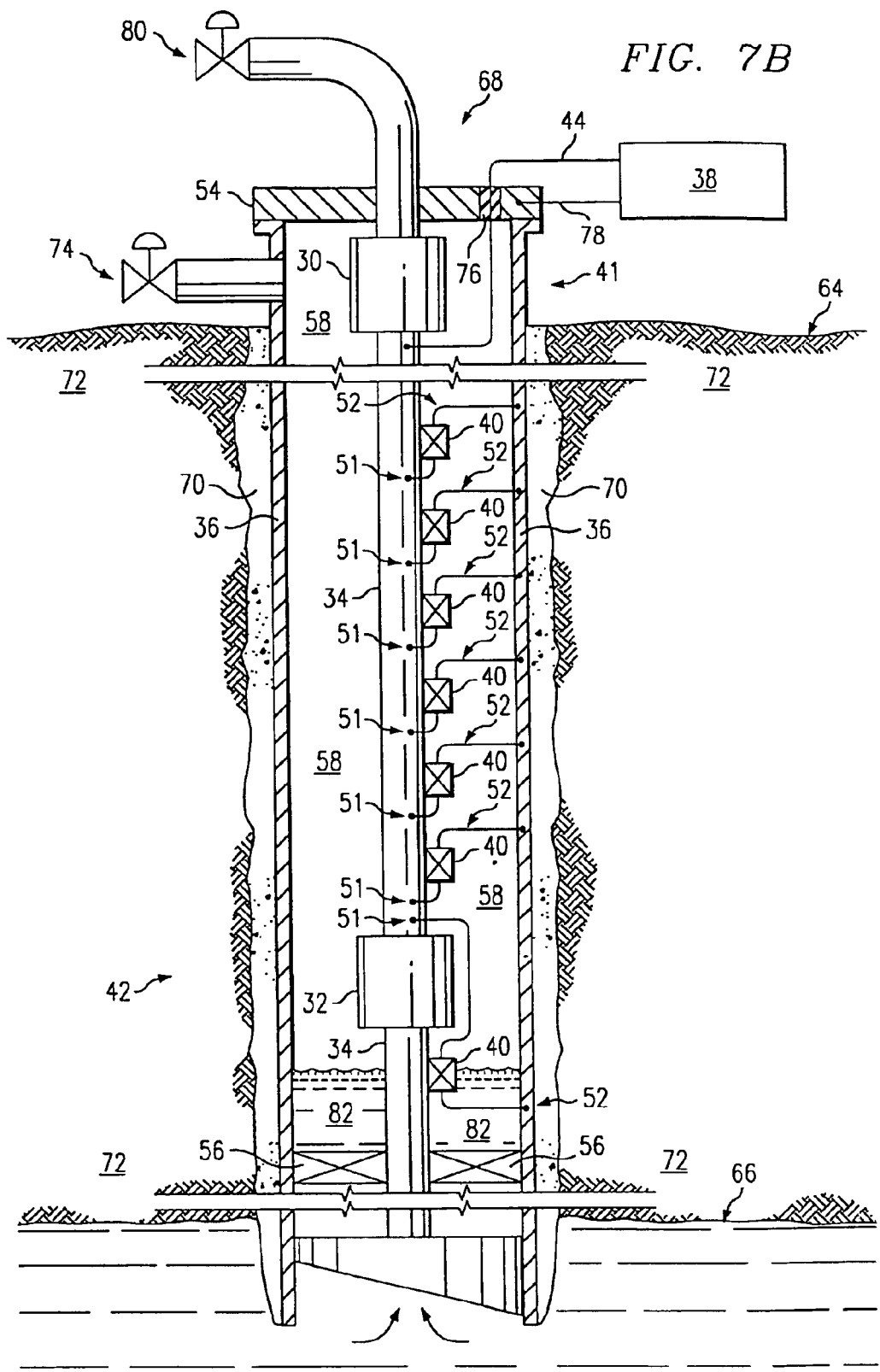
FIG. 7b is a schematic of a petroleum well illustrating downhole equipment power and communications connections in electrical parallel.

FIGS. 7a and 7b illustrate an alternative configuration for the power supply and communications circuits which would be used in cases where a plurality of downhole pods 40 are needed. It will be apparent that the configuration of FIG. 7a is based on the basic configuration illustrated in FIGS. 1 and 2. The power and communications connections from each pod 40 have an associated choke 31, and the power and communication AC signals are in series as shown in the equivalent circuit illustrated in FIG. 3. FIG. 7b shows an alternative configuration where the tubing between uphole choke or insulating tubing joint 30, and downhole choke 32, is a common power supply and communications connection for all the pods 40 between devices 30 and 32. The power and communications signal return connections are all made to the casing using a sliding contactor 52 between each pod and the casing 36. Thus the power and communications connections are in this case in electrical parallel, as contrasted with the series connections of FIG. 7a. The parallel configuration of FIG. 7b has the advantage that the voltages needed to supply power to a plurality of downhole pods are not additive, and thus the applied voltage at connector 44, needed to operate a plurality of pods, will not exceed a safety limit, typically taken as 24 Volts. The parallel configuration has the disadvantage that the the annulus 58 must be cleared of conductive fluids 82 to a level below the lowermost choke 32 as shown in FIG. 7b.

Figure 7C:
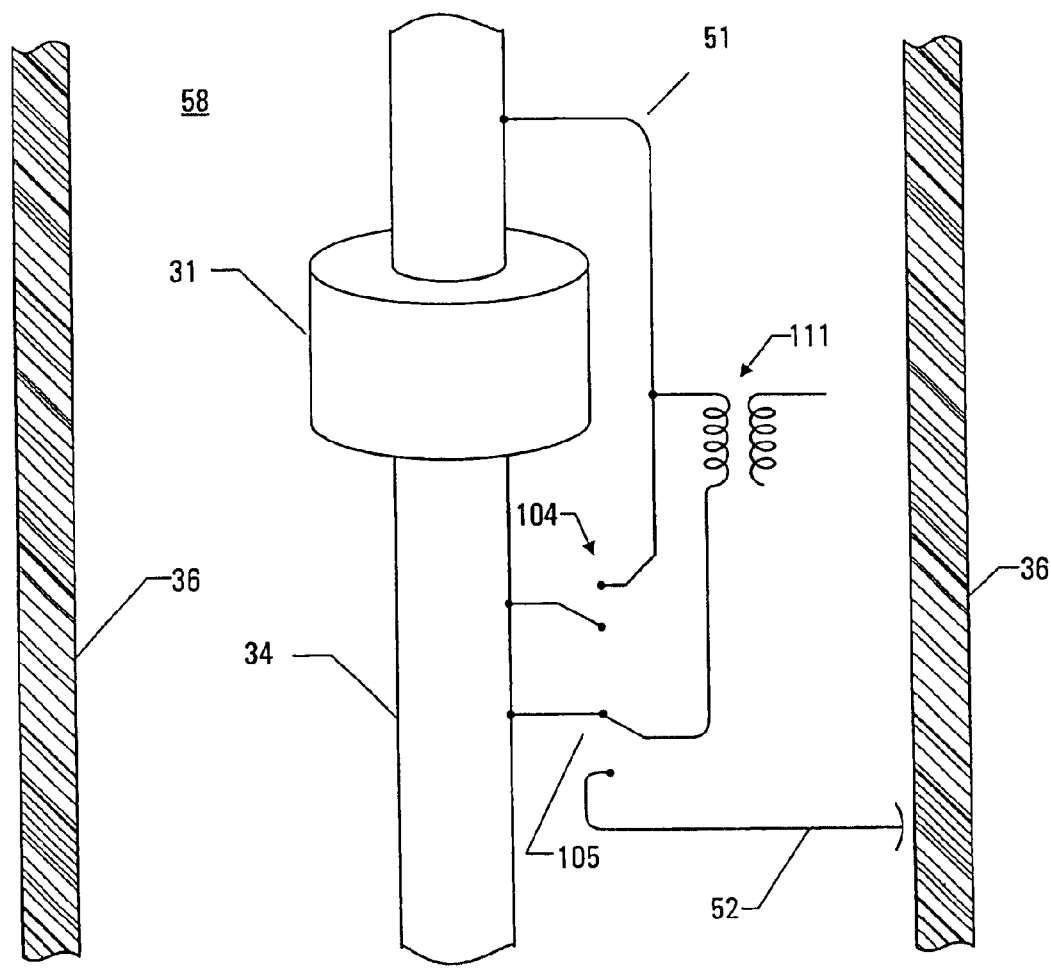
FIG. 7c is a schematic of a switching circuit enabling reconfiguration of downhole power and communications connections.

A combination of the configurations of FIGS. 7a and 7b is possible, and a system that provides dynamic switching between the embodiments of FIGS. 7a and 7b is shown in FIG. 7c. As shown in the figure, the input to the pod power supply input transformer 111 is connected through two switches 104 and 105. The settings of these switches are controlled by commands sent from the surface and received by the modem of the pod. The switches allow power routing within the pod to be reconfigured. With the switches 104 and 105 set as indicated in FIG. 7c, the transformer 111 is powered from the potential developed on tubing section above and below choke 32. This state thus corresponds to the series connection for a pod as illustrated in FIG. 7a. When switch 105 is set to to its other state, power is routed to the input transformer 111 from the tubing section 34 above the choke 32, but is returned to the casing 36 through switch 105 and the sliding contactor connection 52 to the casing 36. This corresponds to the parallel power configuration of FIG. 7b. Switch 104 is optional but is desirable in certain applications, since it allows current to flow around the choke 32 when the switch is closed, and therefore in this state the choke ceases to impede current flow in tubing 34, and thus allows this current to flow without impediment to devices lower in the well.

The ability to reconfigure power routing to multiple downhole pods as shown in FIG. 7c may be applied, for instance, to the unloading of a gas lift well where the casing/tubing annulus 58 is filled with conductive fluid at the start of unloading. In this case, each downhole pod controls a gas lift valve as illustrated in FIG. 2. Initially all the pods are set to the series power configuration. As the unloading proceeds the conductive fluid level is driven past each pod, which then becomes powered and controllable. When the conductive fluid level has fallen below a pod its switch 105 may be set to the parallel power configuration. When the fluid level has passed the next pod in sequence downhole, switch 104 may be configured to remove the current impeding effect of the upper pod choke, and both pods then draw power from the potential on the tubing developed by the action of the lower pod choke. By this method, as the unloading sequence progresses, the pods are progressively switched to parallel connection, and the voltage required to be applied at the wellhead may be kept low, which is desirable for the safety of personnel.

Figure 8:
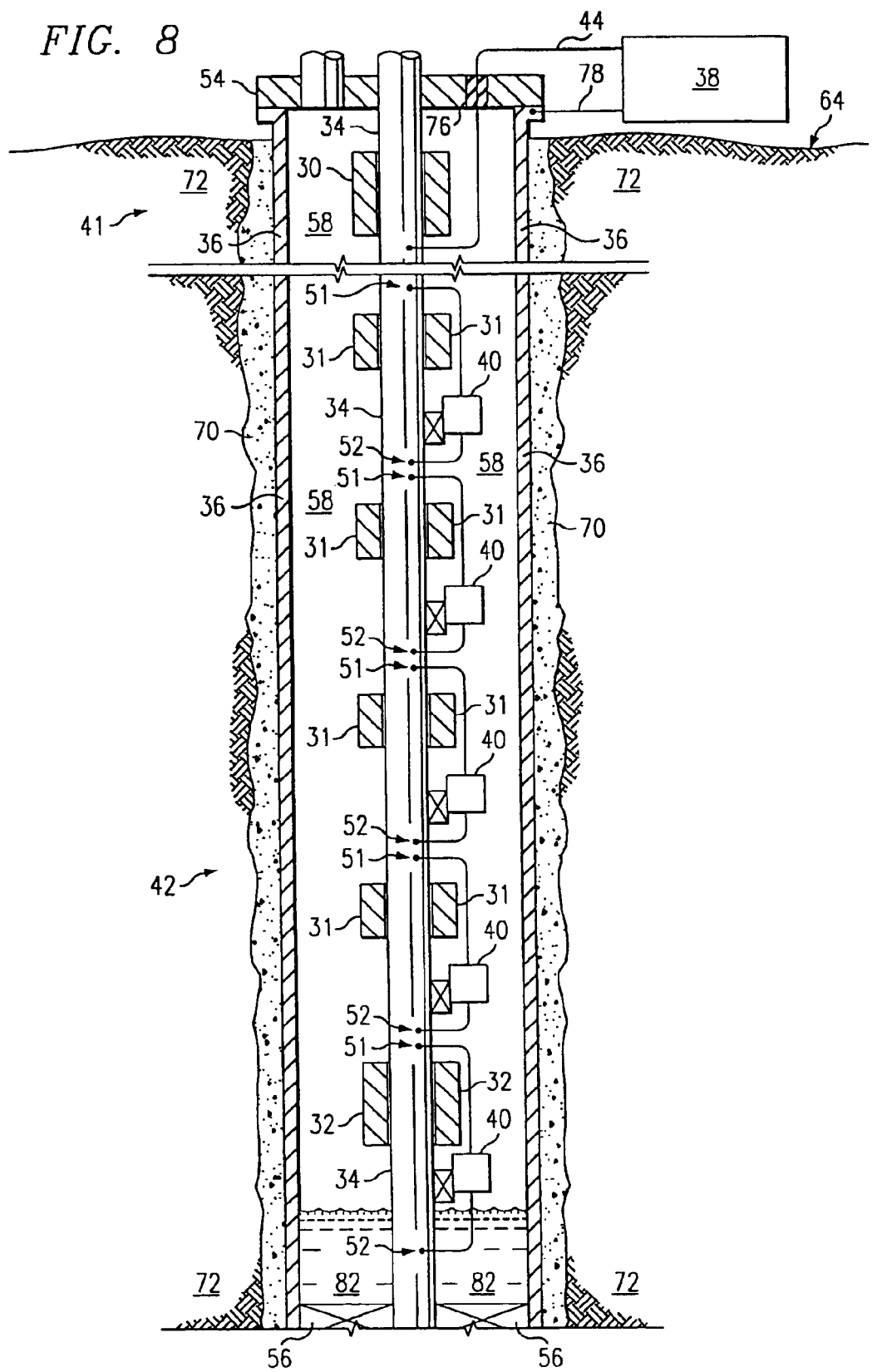
FIG. 8 is a schematic of a petroleum well illustrating the control of power and communications zones by the use of chokes of the present invention.

FIG. 8 shows an alternative embodiment of the present invention, allowing power to be applied selectively to separate zones within a well, where each zone may contain one or more downhole pods. As an example, FIG. 8 illustrates a gas lift well with a plurality of chokes 30, 31, 32, and associated downhole pods 40. As shown in the choke design analysis already described by reference to FIGS. 5a–d, the effect of the choke in impeding AC flow is dependent linearly on the frequency of the AC and the length dimension of the choke (L), all other parameters being held equal. In the well of FIG. 8, chokes 30 and 32 are designed and constructed to impede current flow at low frequencies, for instance 60 Hertz, and chokes 31 are designed to effectively impede current flow only at a significantly higher frequency, for instance 400 Hertz. Following the example given in the design analysis, this may be accomplished by using 15 choke subsections (132 of FIG. 4b) for chokes 30 and 32, but only 3 such choke subsections for chokes 31. With such a disposition of choke sizes, 60 Hertz AC supplied from the surface equipment 38 will energize only the lowest pod associated with choke 32, since chokes 30 will develop insufficient voltage on their associated tubing sections to energize their associated pods. When the AC applied by surface equipment 38 is at 400 Hertz, all the pods will be energized, since all of the chokes are able to develop sufficient potential on their associated tubing section to activate their associated pods. In the case of the gas lift well of FIG. 8 this may aid in the transition from the unloading process to the production process. Since all the gas lift valves are used during the unloading sequence, the AC supplied at the wellhead is 400 Hertz during unloading. Only the lowermost valve, associated with choke 32, is needed during production, so when the unloading has been completed the AC power frequency may be switched to 60 Hertz, so that only the lowermost pod and valve are powered.

There exists a constraint on this zone power selection method. Pods lower in the well must respond to lower applied AC frequency, and pods higher in the well must respond to higher AC frequency, so that the AC impeding effect of the upper chokes does not significantly prevent power from flowing to the lower chokes.

Figure 9:
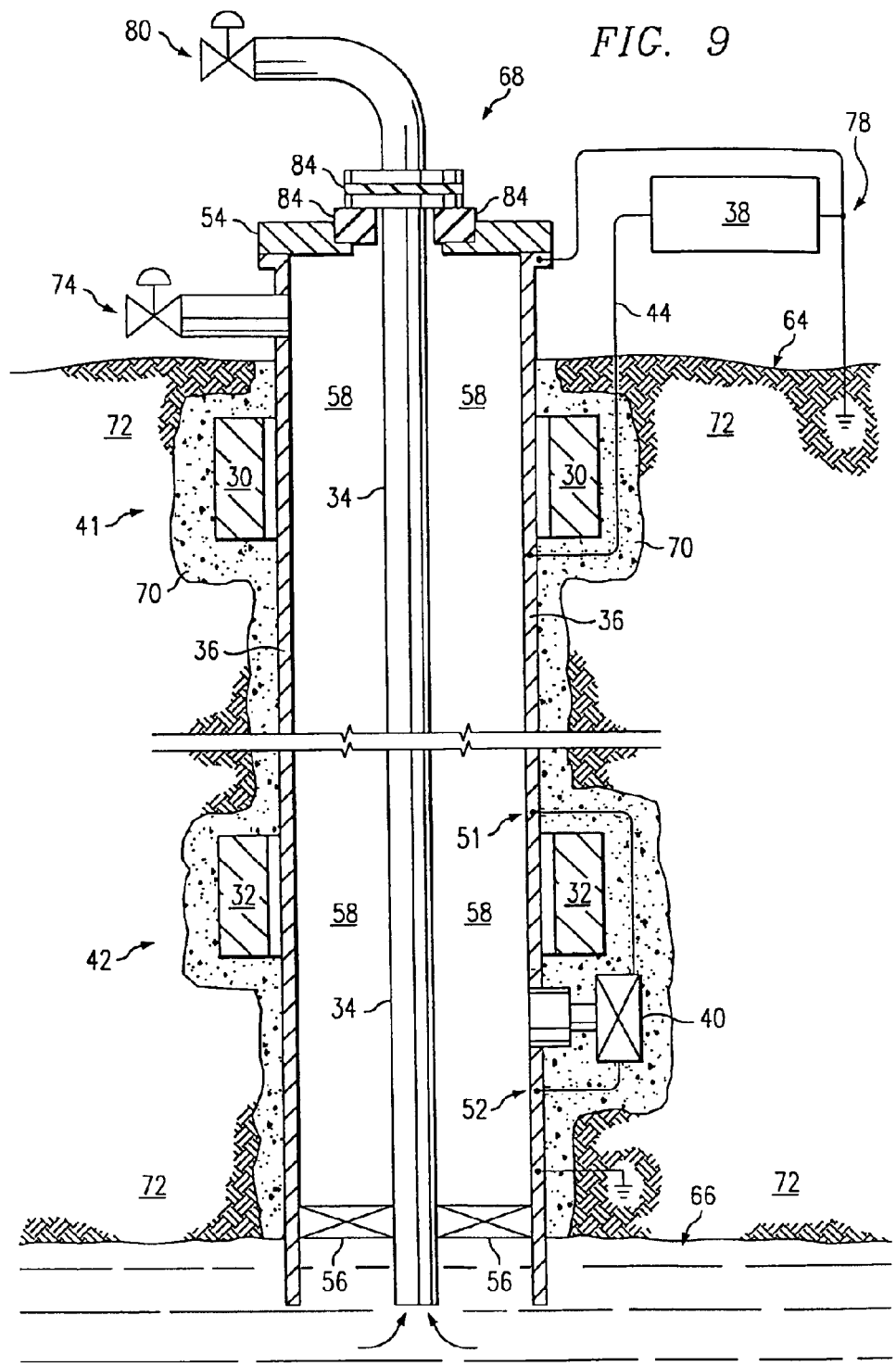
FIG. 9 shows a system in accordance with another embodiment of the present invention, in which chokes are disposed external to the well casing.

FIG. 9 shows a petroleum well application in accordance with another embodiment of the present invention, where the chokes are external to the casing. In this embodiment, the piping structure used to carry the electrical current for the downhole device 40 comprises the casing 36, which is a conductive metal tubing in this case, and the electrical return comprises the earthen ground 72. Thus, in this embodiment, the chokes 30, 32 are located about the casing 36 rather than being located only about the tubing 34 as in the embodiments described previously. In this embodiment, the current flows from the power source 38 to the casing 36 below the upper choke 30, along the casing 36 to a first device terminal 51 (due to the upper choke 30), through the device 40 (due to a voltage potential developed across the lower choke 32) to the earth ground 72 via the casing 36 below the lower choke 32, and back to the source 38 via the earthen ground 72 (and vice versa because AC).

Figure 5A:
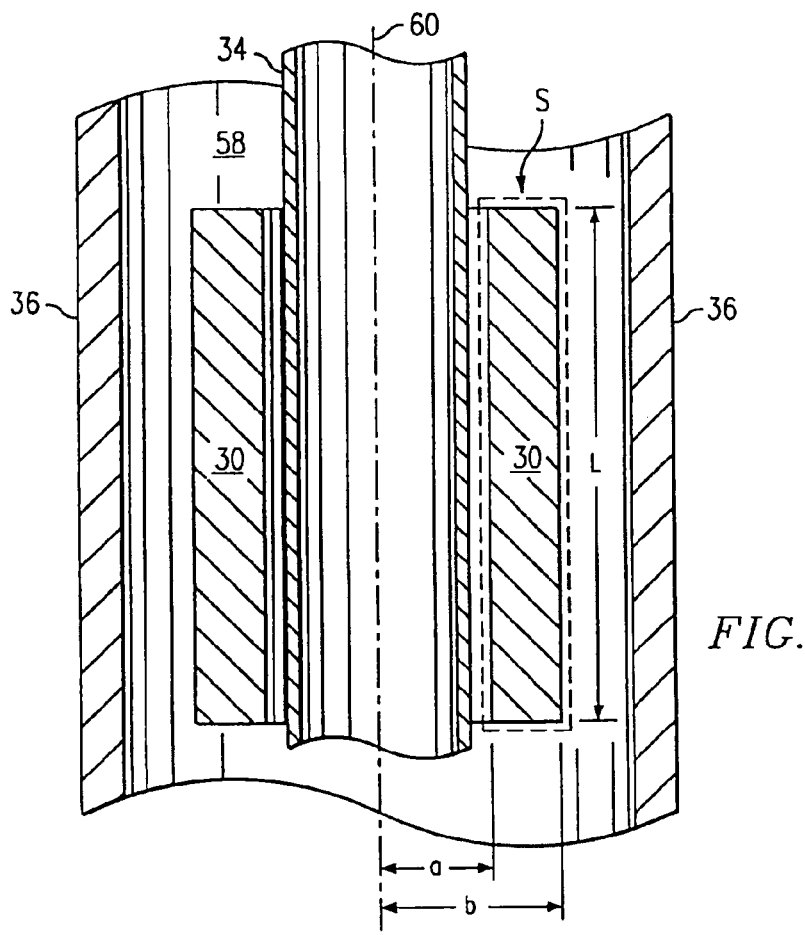
FIG. 5a is an axial cross-section of a choke showing variables used in the design analysis of a choke disposed between tubing and casing.
Figure 5B:
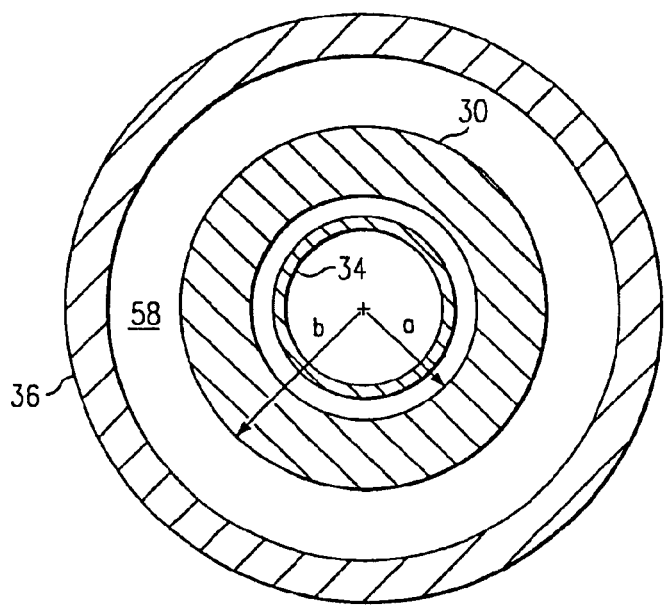
FIG. 5b is a radial cross-section of a choke showing variables used in the design analysis of a choke disposed between tubing and casing.
Figure 5C:
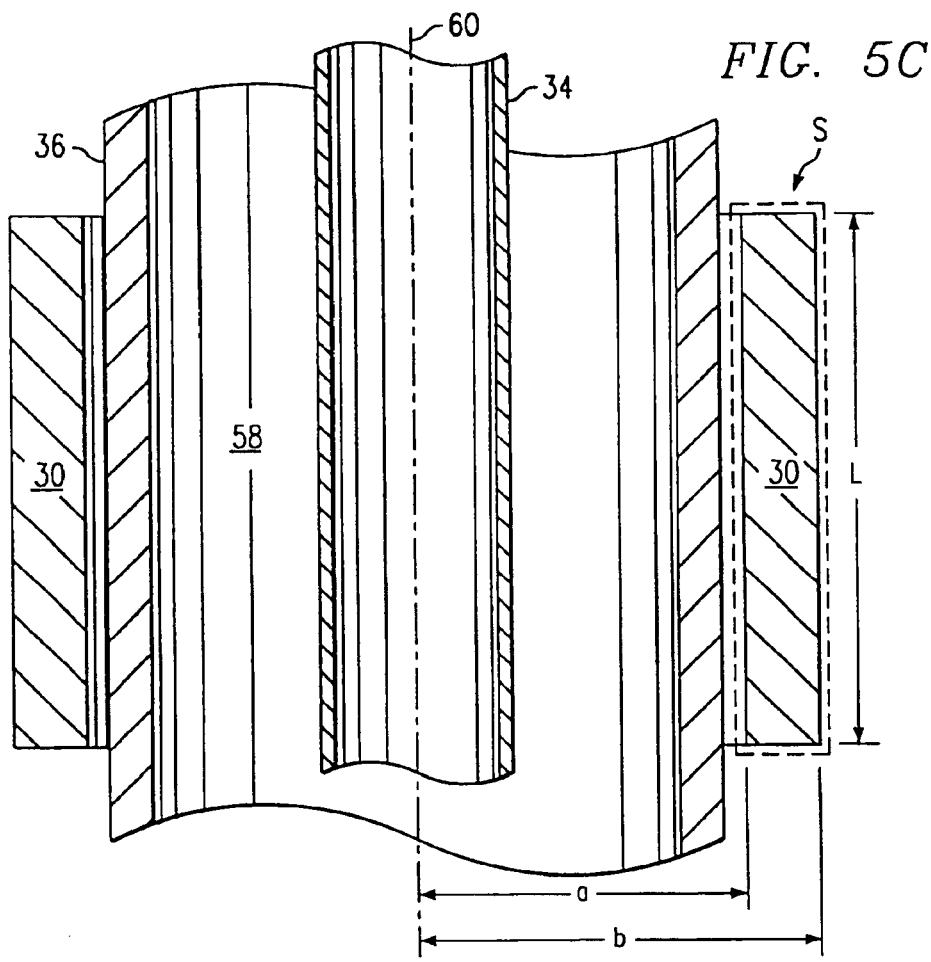
FIG. 5c is an axial cross-section of a choke showing variables used in the design analysis of a choke external to both tubing and casing.
Figure 5D:
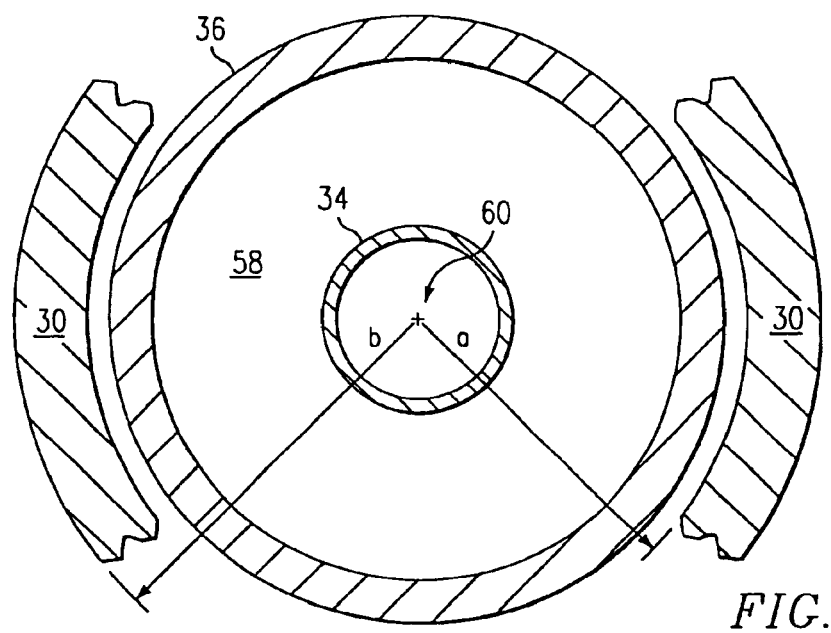
FIG. 5d is a radial cross-section of a choke showing variables used in the design analysis of a choke external to both tubing and casing.

In the choke design analysis previously described with reference to FIGS. 5c–d, current in both the casing 36 and the tubing 34 is impeded by a choke such as 30 or 32 of FIG. 9 since currents on both the casing and the tubing link the choke. The tubing cannot be used as the current return path for power applied to the casing since the magnetic fields from the supply and return currents would balance within the chokes, which would become ineffective. It is for this reason that that the ground return path 72 is necessary.

The potential developed on the casing across the choke 32 is connected by electrical conductors 51 and 52 to power and communicate with an instrument pod 40 located external to the casing. Chokes 30, 32, and the instrument pod 40, are set in the well with the casing and before the cement 70 is injected. As in the previous embodiments the instrument pod 40 may provide bidirectional communication through a modem to return data to the surface from sensors to measure conditions such as formation pressure, temperature, acoustic signals etc connected to pod 40, and to accept control commands from the surface.

Figure 10:
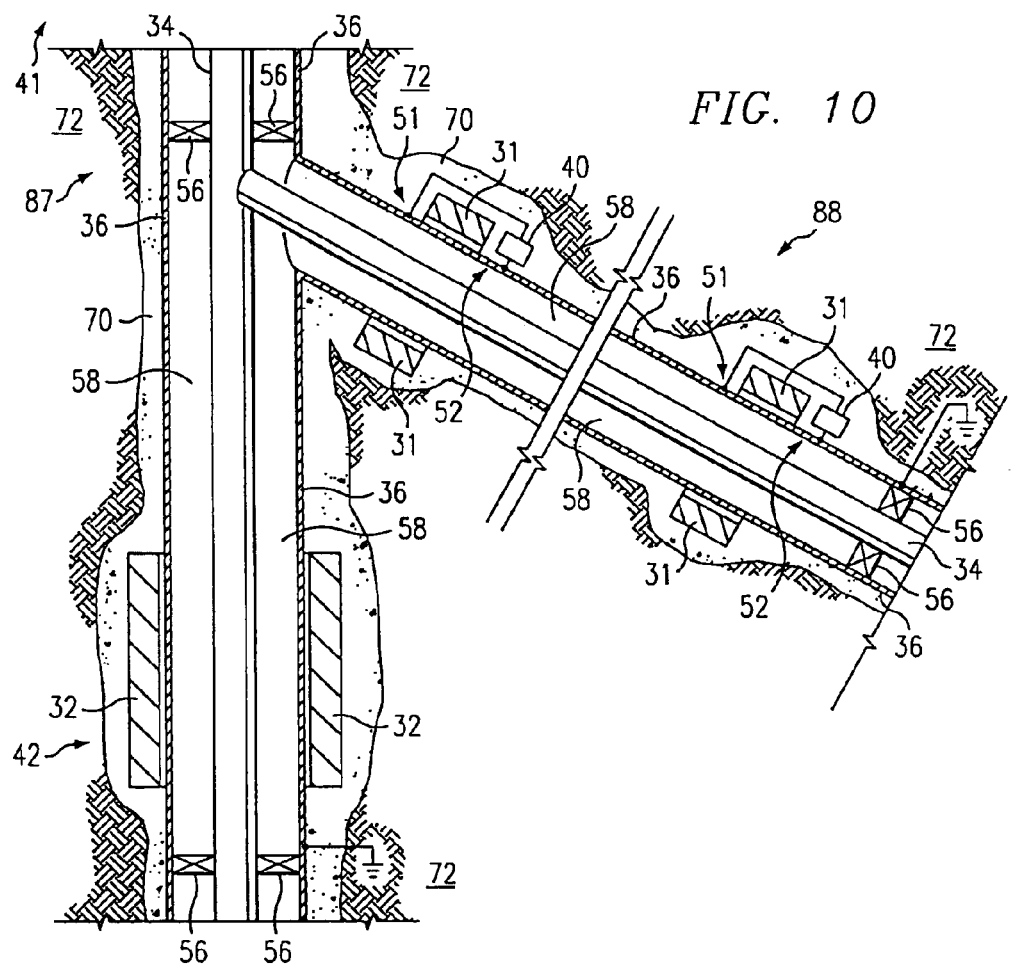
FIG. 10 shows a system in accordance with another embodiment of the present invention, in which a single choke is disposed to direct power into a lateral.

FIG. 10 shows a petroleum well application in accordance with another embodiment of the present invention This embodiment provides a means to divert power and/or communications signals into the casing or liner of a lateral. Power and/or communications signals are conveyed on the casing of the main well bore using the same disposition of surface equipment as in FIG. 9. The main well bore is furnished with upper and lower packers 56. Choke 32 is external to the main wellbore casing 36. The electrical potential developed in the casing by choke 32 acts to divert current and/or communications signals from the main wellbore casing 36 onto the casing or liner of the lateral 88. By this means power is made available to pods 40 external to the lateral casing or liner using the same method as the downhole pod illustrated in FIG. 9.

Figure 11:
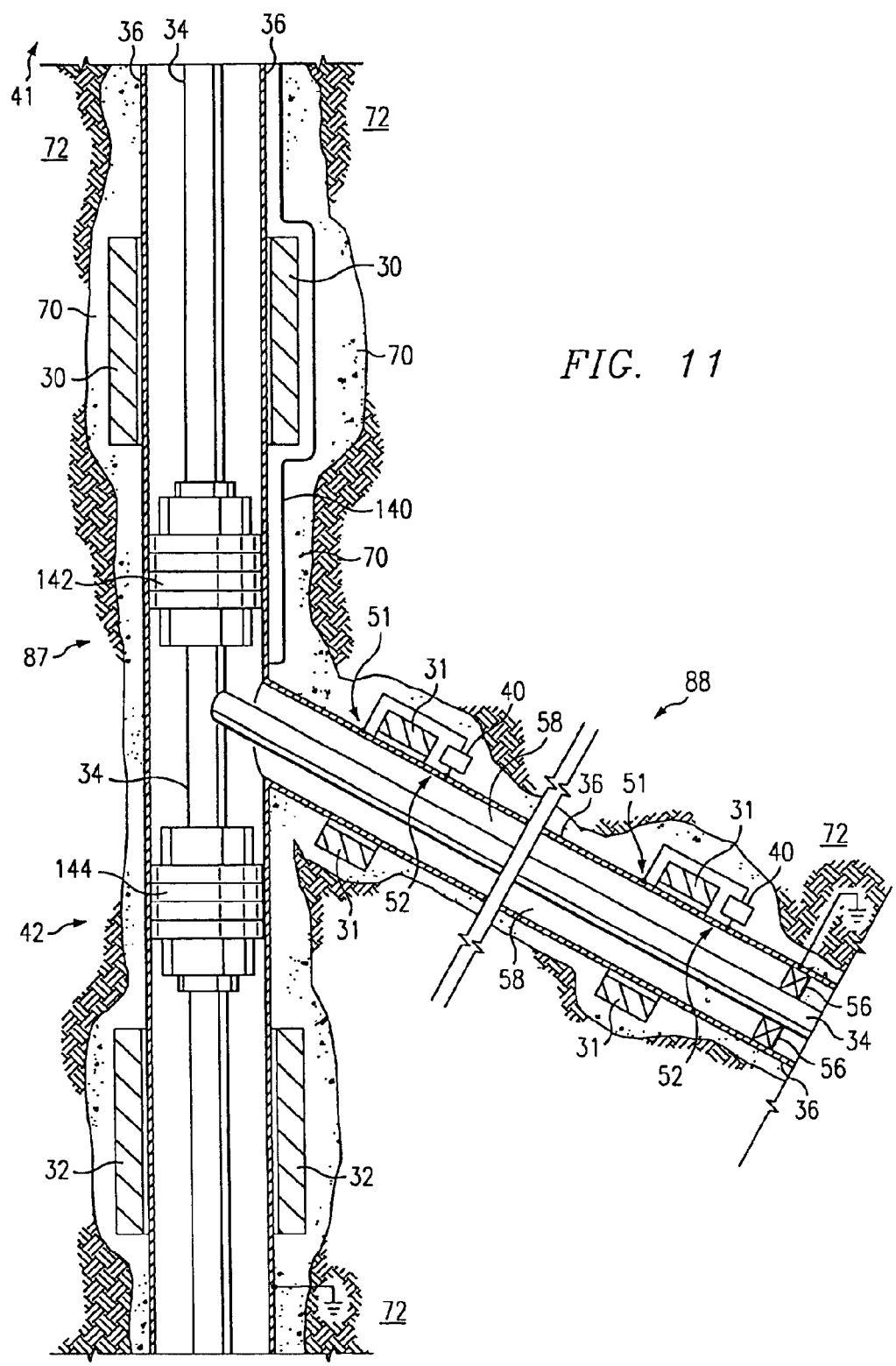
FIG. 11 shows a system in accordance with another embodiment of the present invention, in which two chokes are disposed to direct power into a lateral.

FIG. 11 shows a petroleum well application in accordance with another embodiment of the present invention. This embodiment provides an alternative means to route power and/or communications signals to the casing or liner of a lateral 88. Power and/or communications signals are supplied from the source at the surface through an armored cable 140. The cable 140 is set within the cement 70 between the casing 36 and the earth 72, and it is routed outside of an upper choke 30. In this example, the upper choke 30 is at the second end 42 of the main borehole 87 just above the lateral branch 88. However, upper choke 30 may be placed anywhere along the casing 36 between the surface and the branch point 70 of the lateral 88. An upper packer 142 in the main borehole 87 is located between the upper choke 30 and the lateral branch 88, and the upper packer 142 electrically connects the tubing 34 and casing 36. The tubing 34 and casing 36 above the upper choke 30 electrically lead back to the earthen ground 72. Because the cable 140 is electrically connected to the casing 36 below the upper packer 142 and the upper choke 30, the current travels in the same direction at any given time within both the tubing 34 and casing 36 at the upper choke 30. Hence, the upper choke 30 impedes current from flowing through the tubing 34 and casing 36 at the upper choke. Similarly, a lower packer 144 in the main borehole 87 is located between the lateral branch 88 and a lower choke 32, and the lower packer 144 electrically connects the tubing 34 to the casing 36. The tubing 34 and casing 36 also electrically lead to the earthen ground 72 below the lower choke 32. Hence, the lower choke 32 impedes current from flowing through the tubing 34 and casing 36 at the lower choke. Thus, AC flowing through the cable 140 is routed into the tubing 34 and casing 36 within the lateral branch 88. By this means power is made available to a pod external to the lateral casing or liner using the same method as the downhole pod illustrated in FIG. 9.

Figure 12:
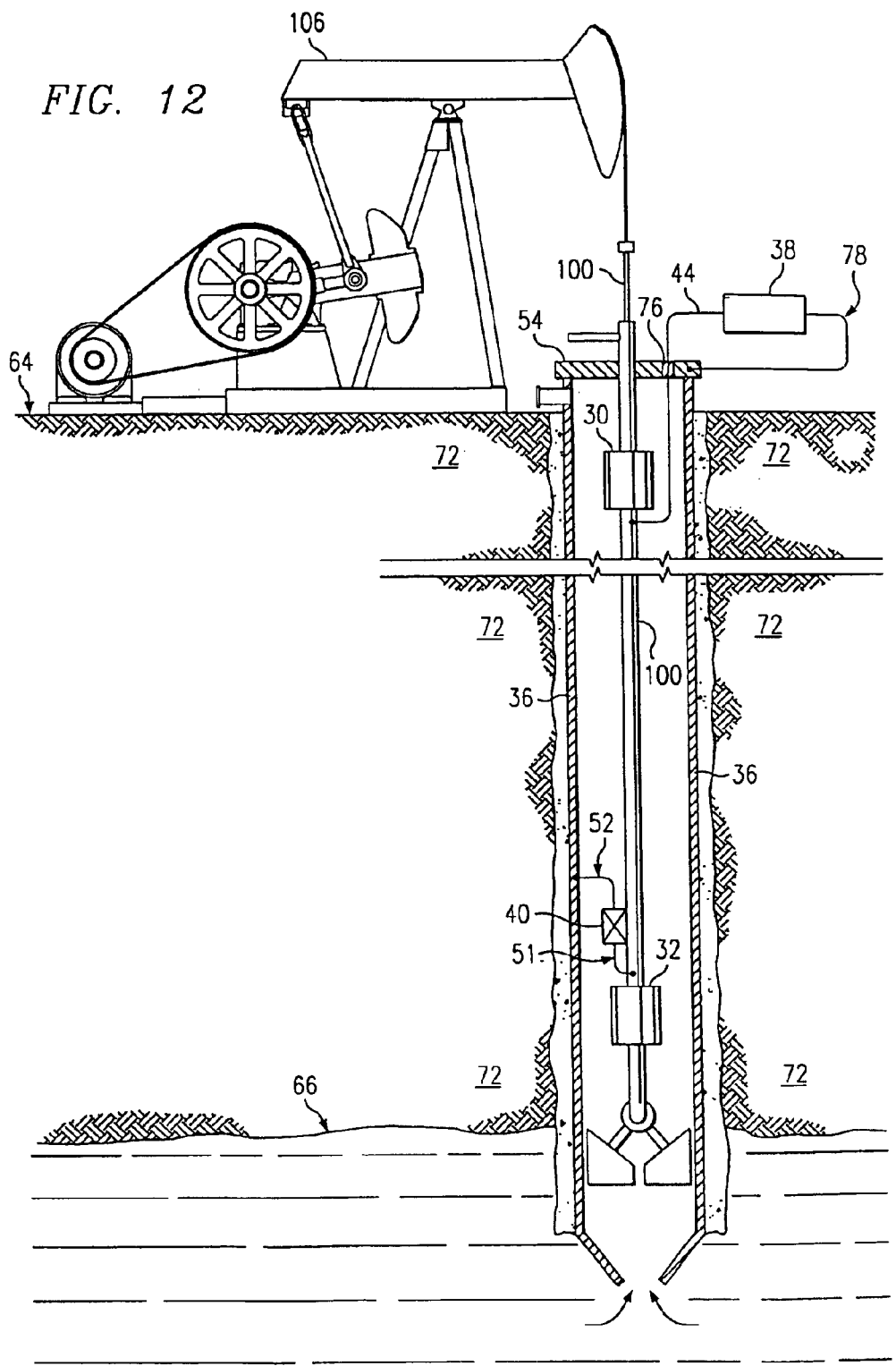
FIG. 12 shows a system in accordance with another embodiment of the present invention, in which chokes are disposed on a pump rod.
Figure 13:
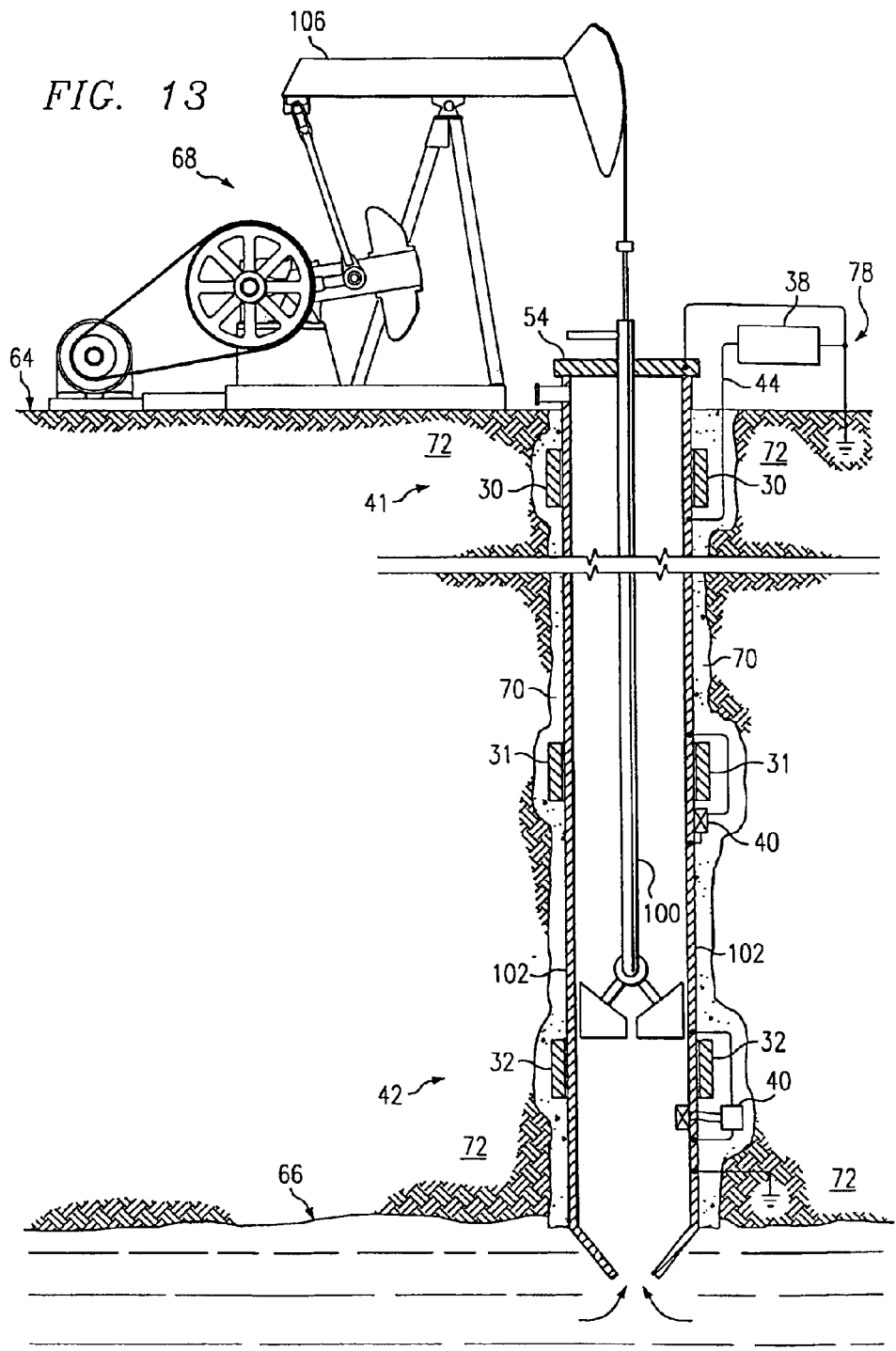
FIG. 13 is alternative embodiment to FIG. 12.

Many of the examples described thus far have focused on gas lift petroleum wells. However, a rod pumping artificial lift or "sucker rod" oil well may also incorporate the present invention. FIGS. 12 and 13 show a petroleum well in accordance with another embodiment of the present invention. In this embodiment, the piping structure for carrying current to a device 40 downhole comprises a pumping rod 100 of a rod pumping artificial lift oil well, and the return is on the casing 36. If rod guides are required to prevent the rod 100 from touching the casing, they must be electrically insulating.

Figure 14:
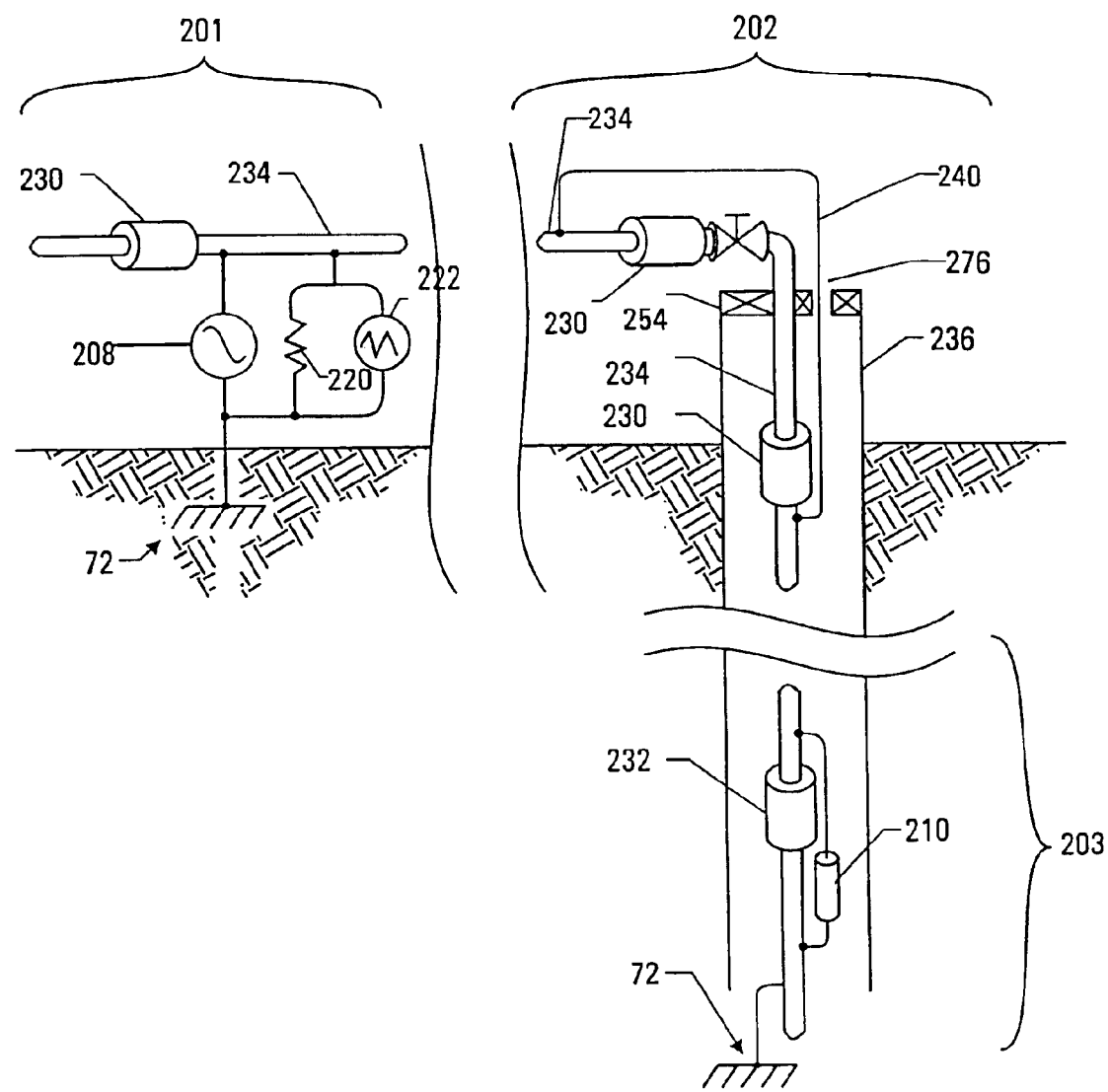
FIG. 14 is a schematic showing the use of chokes to provide electrical power and communications between a central field facility and individual well heads using collection lines as the transmission path.

FIG. 14 illustrates an embodiment using the methods of the present invention in the case where it is desired to locate the surface power and communications equipment at a distance from the well head. The power and communications elements located at the central field facility 201 comprise collector tubing 234, a choke 230, an AC power source 248, the modem receiver represented by its input impedance 212, and the modem transmitter represented by its AC generator 214. One side of the power and modem elements is connected to ground 72, and the other side is connected to the collector tubing 234.

Referring still to FIG. 14, the collector tubing 234 extends from the central facility 201 to the wellhead location 202. At the wellhead the collector tubing is furnished with choke 230, and an electrical cable 240 carries the power and communications AC through the insulating feedthrough 276 to the production tubing below the well upper choke. By this means the power and communications ACs are not required to pass over the section of production tubing where it passes into the well. In standard well construction practice this section of the tubing 234 is electrically connected to the casing 236 at the point where it passes through the tubing hanger 254, and in this case the separate electrical connection 240 is required. If non-standard construction practice is acceptable, then the use of electrically isolating tubing joints and feedthroughs may eliminate the need for the separate conductor 240 and its associated chokes.

At depth 203 in the well, the production tubing 234 is furnished with a choke 232 and an electrical pod 210. These function as described in reference to FIGS. 1 and 2, with the return connection from the downhole equipment being effected by the downhole ground connection 72.

Even though many of the examples discussed herein are applications of the present invention in petroleum wells, the present invention also can be applied to other types of wells, including but not limited to: water wells and natural gas wells.

Also in a possible embodiment (not shown) of the present invention, the piping structures of two adjacent wells can be used to form a current loop for the electrical circuit. For example, a second end of a piping structure of a first well may be electrically connected (e.g., via a wire, conductive fluid, and/or the earth) to a second end of a piping structure of a second well adjacent to the first well, and a first end of the piping structure of the first well is electrically connected to a first terminal of a power source and a first end of the piping structure of the second well is electrically connected to a second terminal of the source, such that the electrical circuit is formed by using the piping structures of both wells. Hence, one of the piping structures will act as an electrical return. In another possible embodiment (not shown), two piping structures of a same well (e.g., two adjacent lateral branches) can be used to form a current loop for an electrical circuit. For example, the piping structure can be a first lateral branch and the electrical return can be a second lateral branch.

One skilled in the art will see that the present invention can be applied in many areas where there is a need to provide power and/or communication within a borehole, well, or any other area that is difficult to access. As discussed above, a production tubing string, as used in oil fields for withdrawing oil from a reservoir, is an example of a well with limited access downhole. Another example is the use of the present invention to provide power and/or communications to a device within a borehole of a machine part, where access within the borehole is limited. For example, when looking for cracks in a steam turbine using nondestructive testing techniques (e.g., ultrasonics, eddy current), there is often a need to provide power and communications to a sensor deep within a borehole of the steam turbine rotor that may be three to six inches in diameter and thirty feet long. The piping structure can comprise a rod or tube that physically supports the sensor, and the electrical return can comprise the machine part being inspected. Hence, the use of the present invention can provide a system and method of providing power and communications to a sensor deep within the borehole where access is limited.

Also, one skilled in the art will see that the present invention can be applied in many areas where there is an already existing conductive piping structure and a need to route power and/or communications in a same or similar path as the piping structure. A water sprinkler system or network in a building for extinguishing fires is an example of a piping structure that may be already existing and having a same or similar path as that desired for routing power and/or communications. In such case another piping structure or another portion of the same piping structure may be used as the electrical return. The steel structure of a building may be used as an electrically conductive structure and/or electrical return for transmitting power and/or communications in accordance with the present invention. The steel reinforcing bar in a concrete dam or a street pavement may be used as an electrically conductive structure and/or electrical return for transmitting power and/or communications in accordance with the present invention. The transmission lines and network of piping between wells or across large stretches of land may be used as a piping structure and/or electrical return for transmitting power and/or communications in accordance with the present invention. Surface refinery production pipe networks may be used as a piping structure and/or electrical return for transmitting power and/or communications in accordance with the present invention. Thus, there are numerous applications of the present invention in many different areas or fields of use.

It will be appreciated by those skilled in the art having the benefit of this disclosure that this invention provides a system that uses at least one unpowered induction choke to form an electrical circuit in a piping structure. It will also be appreciated by those skilled in the art having the benefit of this disclosure that this invention provides a system for providing power and/or communications to a device downhole in a borehole of a well using an electrical circuit formed in a piping structure by using at least one unpowered induction choke. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

We claim:

1. A passive impedance device for creating a voltage differential when time variant current is applied to a tubular connected to a top and bottom connection to the passive impedance device, the passive impedance device comprising:

a tubular having a threaded connection at a first end of the tubular and a threaded connection at a second end of the tubular;

a plurality of subsections surrounding the tubular, each subsection comprising a plurality of layers of a ferromagnetic alloy, each layer separated by an electrically insulating material;

a non-electrically conductive insulator between each of the subsections; and a protective covering over the plurality of subsections.

2. The passive impedance device of claim 1 wherein the protective covering is a shrink-wrapped polymer tube.

3. The passive impedance device of claim 1 wherein the protective covering is a shrink-wrapped polymer sheet.

4. The passive impedance device of claim 1 wherein the ferromagnetic alloy comprises about 86% nickel and about 14% iron.

5. The passive impedance device of claim 1 wherein the ferromagnetic alloy has a magnetic permeability of about 50,000.

6. The passive impedance device of claim 1 wherein the non-electrically conductive insulator between each of the subsections is a polymeric washer.

7. The passive impedance device of claim 6 wherein the polymeric washer is a polytetrafluoroethylene washer.

8. The passive impedance device of claim 1 wherein the subsections each comprise about 60 layers of the ferromagnetic alloy.

9. The passive impedance device of claim 1 wherein each of the layers of ferromagnetic alloy is about 0.014 inches in thickness.

10. The passive impedance device of claim 1 further comprising an electrical conductor passing from a connection to first end of the tubular extending outside of the subsections to a terminal near the second end of the tubular.

11. The passive impedance device of claim 10 further comprising an electrically operated device driven by voltage differences between the terminal and an electrical connection at the second end of the tubular.

* * * * *